(12) United States Patent
Suenaga et al.

(10) Patent No.: US 10,312,604 B2
(45) Date of Patent: Jun. 4, 2019

(54) CRIMPING TERMINAL AND ELECTRIC WIRE WITH CRIMPING TERMINAL

(71) Applicant: Hitachi Metals, Ltd., Tokyo (JP)

(72) Inventors: Kazufumi Suenaga, Hitachinaka (JP); Setsuo Ando, Hitachi (JP); Hisashi Tate, Hitachi (JP); Yuju Endo, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/616,513

(22) Filed: Jun. 7, 2017

(65) Prior Publication Data

US 2018/0358712 A1 Dec. 13, 2018

(51) Int. Cl.

| | |
|---|---|
| *H01R 4/10* | (2006.01) |
| *H01R 9/24* | (2006.01) |
| *H01R 4/18* | (2006.01) |
| *H01R 4/58* | (2006.01) |
| *H01R 4/20* | (2006.01) |
| *H01R 9/03* | (2006.01) |
| *H01R 43/05* | (2006.01) |
| *B82Y 30/00* | (2011.01) |

(52) U.S. Cl.
CPC ............ *H01R 4/18* (2013.01); *H01R 4/20* (2013.01); *H01R 4/58* (2013.01); *H01R 9/03* (2013.01); *H01R 43/05* (2013.01); *B82Y 30/00* (2013.01)

(58) Field of Classification Search
CPC ........ H01R 4/185; H01R 4/188; H01R 4/184; H01R 4/18; H01R 4/183; H01R 9/0518
See application file for complete search history.

(56) References Cited

U.S. PATENT DOCUMENTS

| | | | |
|---|---|---|---|
| 2,815,497 A * | 12/1957 | Redslob ............ | H01R 4/62 174/90 |
| 6,942,529 B2 | 9/2005 | Fujimoto et al. | |
| 8,245,396 B2 * | 8/2012 | Kondo ............ | H01R 4/185 174/84 R |
| 8,303,355 B2 | 11/2012 | Ono et al. | |
| 8,519,267 B2 * | 8/2013 | Peters ............ | H01R 4/203 174/122 C |

(Continued)

FOREIGN PATENT DOCUMENTS

| | | |
|---|---|---|
| JP | 08-321331 A | 12/1996 |
| JP | 2000-306428 A | 2/2000 |

(Continued)

OTHER PUBLICATIONS

Yamano, Y. Jul. 2011, "Development of Aluminum Wiring Harness", SEI technical review, 179, 81-88 (English abstract provided).

(Continued)

*Primary Examiner* — Xuong M Chung Trans
(74) *Attorney, Agent, or Firm* — Roberts Mlotkowski Safran Cole, & Calderon, P.C.

(57) ABSTRACT

A crimping terminal includes a crimping part that is compressed to a conductive part of an electric wire, and a buffer layer formed on a surface where the crimping part contacts the conductive part. The buffer layer includes a resin, a plating or a grease and a conductive microscopic particle that is mixed and dispersed therein. The microscopic particle includes a fractal structure including a fine protrusion on a surface of the microscopic particle.

9 Claims, 21 Drawing Sheets

(56) References Cited

U.S. PATENT DOCUMENTS

| | | | |
|---|---|---|---|
| 8,932,716 B2 | 1/2015 | Ishimatsu et al. | |
| 9,759,742 B2 * | 9/2017 | Lee ..................... | G01R 1/0433 |
| 2004/0157504 A1 | 8/2004 | Fujimoto et al. | |
| 2011/0003518 A1 | 1/2011 | Ono et al. | |
| 2012/0090882 A1 | 4/2012 | Ishimatsu et al. | |

FOREIGN PATENT DOCUMENTS

| JP | 2004-193073 | 7/2004 |
|---|---|---|
| JP | 2009-277572 A | 11/2009 |
| JP | 2010-003584 A | 1/2010 |
| JP | 2010-73681 A | 4/2010 |
| JP | 2011-081911 A | 4/2011 |
| JP | 2012-009178 A | 1/2012 |

OTHER PUBLICATIONS

Office Action issued in corresponding Japanese Application No. 2015-243554 dated Apr. 17, 2019.

* cited by examiner

CRIMPING TERMINAL AND ELECTRIC WIRE WITH CRIMPING TERMINAL

The present application is based on Japanese patent application No. 2015-243554 filed on Dec. 14, 2015, the entire contents of which are incorporated herein by reference.

BACKGROUND OF THE INVENTION

1. Field of the Invention

This invention relates to a crimping terminal and an electric wire with the crimping terminal.

2. Description of the Related Art

A technology in a crimping terminal for an electric wire whose conductive part is constituted by single strand or a plurality of strands made of Aluminum or aluminum alloy has been presented to arrange a concave-convex pattern called as "serration" on a crimping terminal side contact surface, which crimps the conductive part (see e.g. PTL 1 and NPL 1). The concave-convex pattern formed on the contact surface of the crimping terminal pierces an insulating film (such as an oxide film or an organic contaminant film) formed on the surface of aluminum strand. The electric wire electrically conducts with the crimping terminal through an exposed metallic part of the aluminum strand at a crimp surface. Moreover, holding force of the crimping terminal to the electric wire strengthens by increasing pressure at the contact surface using the concave-convex pattern. Meanwhile, copper strand generally constitutes the conductive part of the electric wire. The concave-convex pattern used for the serration of such crimping terminal for the electric wire tends to be formed from a plurality of pits. Thus, a molding die to press so as to form the serration has relatively simple shape.

As to the concave-convex pattern formed on a crimping part of the crimping terminal, a plurality type of pit shapes such as parallelogram, pentagon, hexagon, octagon are assumed as a square shape of each pit forming the concave-convex pattern. Especially, as the interior angle of polygon that forms pit is more than 90°, an edge intruding into the conductive part of the electric wire can extend since an edge region of pit can set widely. As a result, mechanical connection performance increases, and an intruding region into the conductive part of the electric wire extends since contact holding force between the electric wire and the crimping terminal increases. In this case, it is also known that the electrical connection character can increase since a contact pressure increases at the crimping part between the electric wire and the crimping terminal (see e.g. PTL 2).

It is known that an array direction of pits or projections, which configures the serration, an interval between the pits and the projections, the depth of the pits and the projections, and angles of the pits and the projections in the depth (height) direction need to be suitable so as to apply to conditions such as a diameter, a material performance, or a strand structure of the electric wire constituted by single strand or a plural types of strands in forming the serration on the crimping terminal. Importance is known in which the molding die to form the concave-convex pattern precisely should be strictly managed (See e.g. PTL 3).

Alternative technology to the crimping terminal having the serration is known in which the conductive part (the crimped part) of the electric wire constituted by a plurality of strands is coated with hard conductive microscopic particles harder than a strand material before crimping on the crimping terminal (see e.g. PTL 4). The conductive microscopic particles harder than the conductive part of the electric wire made from the strand made of soft copper or copper alloy adopts metallic microscopic particles such as Copper, Nickel, Tungsten, Molybdenum microscopic particles, whose microscopic particle size is within a range of 70 to 200 meshes. The alternative technology applies a joint method by crimping the conductive part of the electric wire after coating the conductive part with the metallic microscopic particles.

For the above alternative technology, the insulating coat on the conductor surface is pierced by relatively easily intruding the conductive microscopic particle on the strand using the pressure in crimping. Thus, each metal under the insulating coat can joint each other by the direct connection with each metal. As the conductive microscopic particle suitably intrudes on the strand caused by concentrating the crimping force on the conductive microscopic particle, which has small contact area, the conductive microscopic particle sufficiently intrudes on the strand by relatively small force. Therefore, the steady electrical connection can remain while the cold impact under the extreme thermal cycle or mechanical vibration applies to the crimping terminal or the electric wire.

The other alternative technology is known in which forms the nickel complex plating layer by dispersing and codepositing a material molecule crystal (such as carbide or oxide), which has hardness higher than the insulating coat formed on the conductor surface of the electric wire, on the inner surface of a swaging part of the crimping terminal, where the conductive part of the electric wire contacts (see e.g. PTL 5). In such technology, the swaging part of the crimping terminal can steadily contact with the conductive part of the electric wire through the plating layer since the plating layer formed on the inner surface of the crimping part of the crimping terminal shear-pierces the insulating coat on the conductor surface by pressure in crimping (swaging).

CITATION LIST

Patent Literatures

PTL 1: JP-A-2010-003584
PTL 2: JP-A-2011-081911
PTL 3: JP-A-2012-009178
PTL 4: JP-A-H8-321331
PTL 5: JP-A-20M-193073

Non Patent Literature

NPL 1: Yamano, Y. June, 2011. "Development of Aluminum Wiring Harness". SEI technical review, 179, 81-88.

SUMMARY OF THE INVENTION

In PTLs 1 to 3 and NPL 1, the molding die to form delicate and fine serration (concave-convex pattern) according to each purpose corresponding to material character, thickness, length, shape, strand wire state, and usage environment of the electric wire as a connection object should be formed. That is, it is necessary to prepare the molding die to form the serration corresponding to product types of the electric wires as the connection object in manufacturing the crimping terminal. Thus, various molding dies should be made. And the significant cost increases. Such technologies lose cost reducing effect that is one of the advantageous effects in Aluminum electric wire.

It is necessary for the molding die to form the serration to check continuous change in mass-product so as to manufacture the crimping terminal keeping highly desired joint performance stably. Meanwhile, various serration shapes are needed as crimping terminal types and connected electric wire types increase. The variation of molding die to form the serration also increases. Therefore, it is essential to check precision of forming the serration in each electric wire periodically. The molding die management is complicated. Moreover, it may cause yield rate reduction by omitting the molding die management.

Specially, edge of margin in the concave-convex pattern formed on the molding die to form the serration causes shape drip (lost in shape) by pressing repeatedly in long time. Specifically, the edge of the concave-convex pattern in the molding die is gradually smoothed down by losing sharpness caused by wearing. The edge angle changes from a sharp angle into an obtuse angle. And the edge changes into smooth and steady shape. As the worn down molding die forms the serration on the crimping terminal and the crimping terminal crimps the conductive part of the electric wire, the crimping terminal fails to cause desired pressing state and shear failure at the serration. As a result, the crimping terminal fails to pierce the insulating coat coating conductor surface of the electric wire completely. Therefore, fine connection performance fails to be obtained.

According to the technology described in PTL 4, the conductive microscopic particle, whose microscopic particle size is undefined and uneven, attaches directly on the conductor surface of the electric wire. On a complicatedly curved surface such as the electric wire, the complicatedly curved surface has poor workability in attaching the conductive microscopic particles. Thus, throughput in the crimping terminal connecting process decreases. Moreover, as the conductor such as strand wire made from a plurality of strands has large concave-convex surface, it is hard to attach the conductive microscopic particles generally and evenly. Therefore, the conductor microscopic particles disperse on the conductor surface unevenly. The crimping force in swaging at the conductor surface where the conductor microscopic particles are dispersed presses unevenly. As a result, the insulating coat coating the conductor surface is partly pierced. And it causes unstable in the contact state at inner surface of swaging part. It is hard to obtain the desired contact resistance.

PTL 5 discloses that a plating layer that disperses the material molecule crystal having higher hardness than the insulating coat is arranged on the inner surface of the swaging part of the crimping terminal. Surface shape or size of the material molecule crystal dispersed in the plating layer fails to be finely controlled. The material molecule crystal has a smooth surface or a random and unstable concave-convex surface. Thus, the pressure forces unevenly on the insulating coat through the material molecular crystal in swaging at each part. It may cause a part having high contact resistance by failing to pierce the insulating coat sufficiently in swaging by same pressure and a part where the holding force weaken caused by creeping in piercing the electric wire with too strong force. As a result, it is hard to stably keep the electrical low contact resistance and the mechanical strong holding force. It may cause yield rate reduction in the connecting process of the crimping terminal.

As to joint except above mechanical joint, the terminal joint by welding is used. Meanwhile, the terminal joint needs improvements such as new structure and new mechanism to hold the welding part so as not to move since the terminal joint by welding is weaker than the mechanical crimping joint by pressing and swaging the terminal on the electrical wire in pulling. Moreover, as the thin electric wire is welded, the remarkable degradation according to thickness reduction or degeneration of the electric wire causes problems such as decreasing the mechanical strength in the welding part and increasing the contact resistance.

It is an object of the invention to provide a crimping terminal that allows the connection with an electric wire to be made with an electrically low contact resistance by mechanically strong holding force without forming a serration (i.e., a concavo-convex pattern) on the crimping terminal using the molding die.

According to an embodiment of the invention, a crimping terminal comprises:

a crimping part that is compressed to a conductive part of an electric wire; and a buffer layer formed on a surface where the crimping part contacts the conductive part, wherein the buffer layer comprises a resin, a plating or a grease and a conductive microscopic particle that is mixed and dispersed therein, and wherein the microscopic particle comprises a fractal structure comprising a fine protrusion on a surface of the microscopic particle.

According to another embodiment of the invention, an electric wire with a crimping terminal comprises:

an electric wire comprising a conductive part; and a crimping terminal comprising a crimping part that is compressed to a conductive part of the electric wire, wherein a buffer layer comprising a resin, a plating or a grease that is interposed in a contact interface between the conductor part and the crimping part, wherein a conductive microscopic particle that comprises a fractal structure comprising a fine protrusion on a surface of the microscopic particle is mixed and dispersed in the buffer layer, and wherein the microscopic particle in the buffer layer pierces an insulating coat on a surface of the conductive part and contacts the conductive part.

EFFECTS OF THE INVENTION

According to an embodiment of the invention, a crimping terminal can be provided that allows the connection with an electric wire with an electrically low contact resistance by mechanically strong holding force without forming a serration (i.e., a concave-convex pattern) on the crimping terminal using the molding die.

BRIEF DESCRIPTION OF THE DRAWINGS

Next, the present invention will be explained in conjunction with appended drawings, wherein.

DETAILED DESCRIPTION OF THE PREFERRED EMBODIMENTS

Next, a preferred embodiment according to the invention will be described below with reference to the appended drawings.

First Embodiment

Figure 1A:
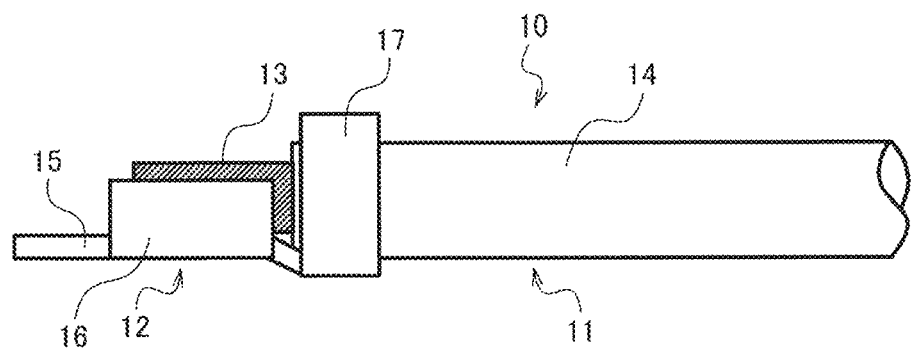
FIG. 1A is a side view showing a crimping terminal and an electric wire with the crimping terminal according to the first embodiment of the present invention.
Figure 1B:
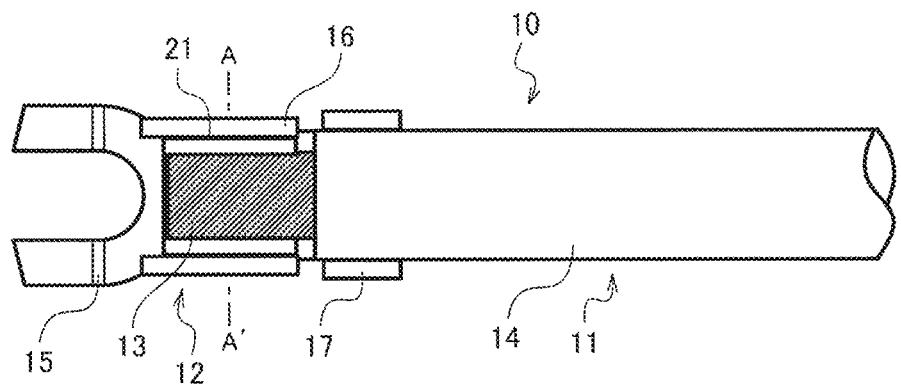
FIG. 1B is a top view showing the crimping terminal and the electric wire with the crimping terminal according to the first embodiment of the present invention.
Figure 1C:
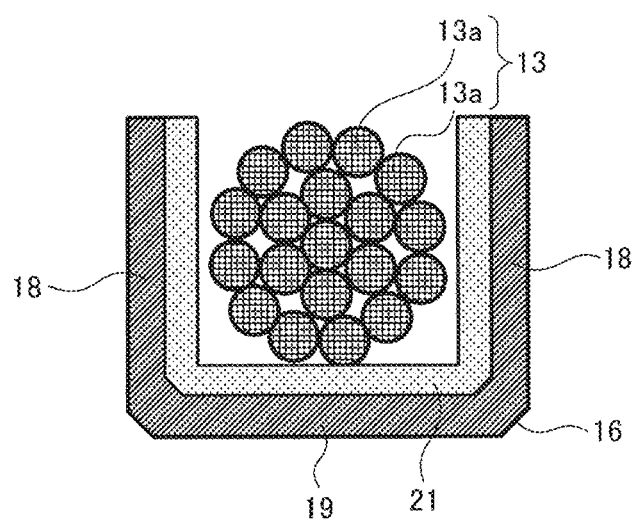
FIG. 1C is a cross sectional view cut along with the line A-A' in FIG. 1B.

FIG. 1A is a side view showing a crimping terminal and an electric wire with the crimping terminal according to the first embodiment of the present invention. FIG. 1B is a top view showing the crimping terminal and the electric wire with the crimping terminal according to the first embodiment of the present invention. FIG. 1C is a cross sectional view cut along with the line A-A' in FIG. 1B. FIGS. 1A to 1C show the electric wire with the crimping terminal before crimping the crimping terminal.

(Electric Wire with Crimping Terminal)

An electric wire with a crimping terminal 10 is provided with an electric wire 11 and a crimping terminal 12. "The electric wire" in the present invention includes not only an insulated electric wire whose conductor is coated with an insulating coat, but also "the cable" whose outermost layer is coated with a sheath. That is, "the electric wire with the crimping terminal" includes "a cable with the crimping terminal" provided with a cable and a crimping terminal.

(Electric Wire)

The electric wire 11 is provided with a conductive part 13 that works as a core wire and a coat 14 that coats the conductive part 13. A single strand or a plurality of strands may constitute the conductive part 13 in the present embodiment. In this embodiment, the plurality of strands 13a constitutes the conductive part 13. Also, the conductive part 13 is constituted by stranding the plurality of metallic strands 13a. For example, the strand 13a that constitutes the conductive part 13 is made of metallic thin wire such as Aluminum, Aluminum alloy, Copper, Copper alloy. In this embodiment, the conductive part 13 is constituted by stranding the plurality of strands 13a made of Aluminum or Aluminum alloy as examples.

The coat 14 concentrically coats the conductive part 13 having a substantially circular cross section. The coat 14 is made from insulating material such as plastic resin. The coat 14 is peeled at the end of the electric wire 11. The conductive part 13 is exposed.

(Crimping Terminal)

For example, the crimping terminal 12 is made of Copper and Copper alloy. The crimping terminal 12 may mainly comprises Copper and Copper alloy and may comprise the other metallic element so as to increase castability (decrease castability coefficient) in manufacturing the crimping terminal 12 by forging. Specifically, the crimping terminal 12 may comprise transition metal elements such as Cr, Mn, Fe, Co, and Ni so as to increase forgeability. Also, the crimping terminal 12 may comprise noble metals such as Pd, Ir, Pt, and Au. Hereby, the electric wire with the crimping terminal having excellent manufacturability can be provided.

The crimping terminal 12 is integrally provided with a connecting part 15 so as to connect features that should be electrically connected (turn on electricity), a crimping part 16 that crimps the conductive part 13 of the electric wire 11, and a holding part 17 so as to hold the coat 14 of the electric wire 11. The connecting part 15, the crimping part 16, and the holding part 17 are integrally formed in order in the horizontal direction shown in FIG. 1A. The connecting part 15 is formed into U-shape from plan view. The crimping part 16 comprises a pair of right and left side walls 18, and a lower wall 19 that connects each end of the side walls 18. As shown in FIG. 1C, the crimping part 16 is formed into pit shape before crimping. Also, the holding part 17 is formed into the pit as with the crimping part 16 before crimping. The crimping part 16 is formed so as to receive the conductive part 13 of the electric wire 11. The holding part 17 is formed so as to receive the coat 14 of the electric wire 11.

A buffer layer 21 is formed on an inner surface of the crimping part 16. The buffer layer 21 is formed so as to coat the inner surface of the crimping part 16. The inner surface of the crimping part 16 is a contact surface with the conductive part 13 in crimping the crimping part 16 on the conductive part 13 of the electric wire 11. The buffer layer 21 is respectively formed on one pair of the side walls 18 facing each other, and a top surface of the lower wall 19 in forming the crimping part 16 with one pair of the side walls 18 and the lower wall 19 as described above.

(Buffer Layer)

The buffer layer 21 is made from resin, metal plating, or grease (compound), which has waterproofness and corrosion resistance for the conductive part 13 and the crimping part 16. Conductive microscopic particles are mixed (combined) and dispersed in the buffer layer 21. Many (a number of) microscopic particles are mixed in the buffer layer 21 with the predetermined ratio. As a base layer of the buffer layer 21 is made from an insulating material such as resin, the buffer layer 21 has conductivity caused by the microscopic particles mixed and dispersed in the buffer layer 21.

(Microscopic Particle)

Figure 2A:
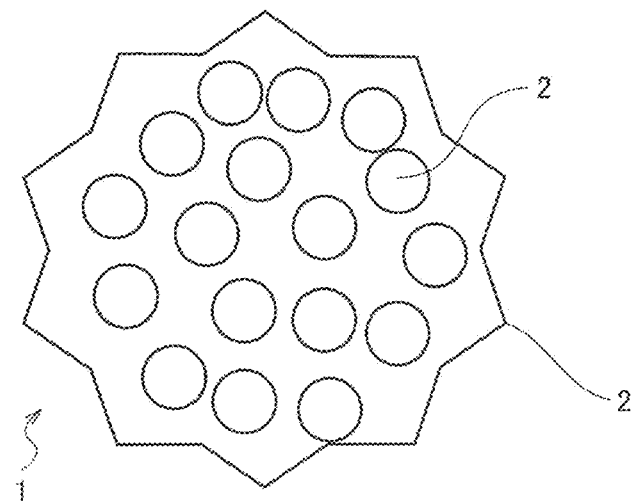
FIG. 2A is a schematic view showing a microscopic particle according to the embodiments of the present invention.
Figure 2B:
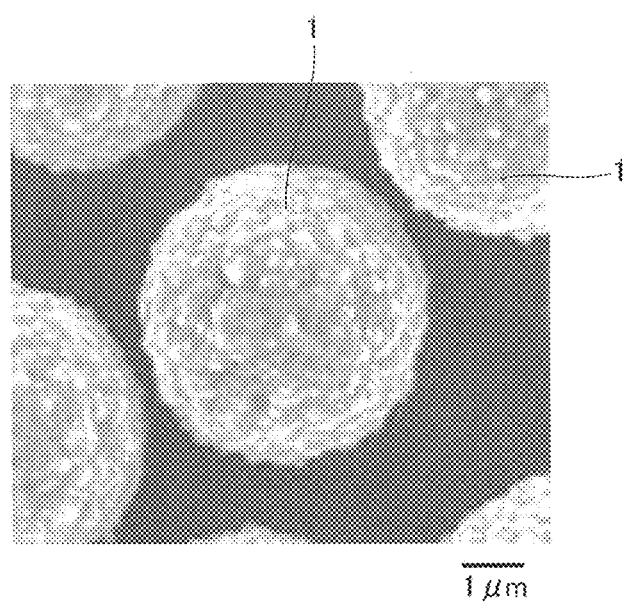
FIG. 2B is a scan electron microscope (SEM) image showing the microscopic particle that the inventors manufactured.

The microscopic particle mixed and dispersed in the buffer layer 21 will be explained. FIG. 2A is a schematic view showing a microscopic particle according to the embodiments of the present invention. FIG. 2B is a scan electron microscope (SEM) image showing the microscopic particle that the inventors manufactured. The microscopic particle 1 shown in FIG. 2A has the fractal structure (including similar structures). A plurality of minute fine protrusions 2 is formed on the surface of the microscopic particle 1. The diameter of the microscopic particle 1 can be made minimum in the scale of the lattice number of the crystal unit cell, for example, that is about 0.352 nm in the face-centered cubic lattice of Ni. Herein, according to an object, the fractal structure means the structure having "similar" figure with whole object even if the object is cut in fine region. The fractal structure generally means the structure having self-similarity. From the mathematic view, the fractal structure has non-integer dimensions different from the first dimension, the second dimension, and the third dimension. Typical fractal structure is such as Koch figure. The fractal structure occurs in the nature. For example, Konpeito, snow crystal, coastline, and branches and leaves of tree (leaf vein) are known as the fractal structure. The microscopic particle 1 comprises many fine protrusions 2 on the surface. That is, fine concavo-convex pattern made from many fine protrusions 2 is formed on the surface of the microscopic particle 1. The concavo-convex size of the fine protrusion 2 can be made minimum in the scale of the atomic radius that can be the minimum so as to make substantially as the fractal structure in the natural. For example, the minimum is about 0.124 nm in Ni. The microscopic particle 1 is substantially formed spherically. Incidentally, the diameter of the microscopic particle 1 shown in FIG. 2B is about 5 μm.

Curvature radius of the tip of the fine protrusion 2 formed on the surface of the microscopic particle 1 is preferable to be not less than 0.03 nm and not more than 500 nm. Also, as described above, the curvature radius of the tip of the fine protrusion 2 is preferable to be not less than 0.0006% of the radius of the microscopic particle 1 and not more than 10% of the radius of the microscopic particle 1. The height of the fine protrusion 2 (the length from the main surface of the microscopic particle 1 to the tip of the fine protrusion 2) is preferable to be less than 0.5% in the diameter of the microscopic particle 1. Furthermore, the height of the fine protrusion 2 is preferable to be not less than 0.05 nm and less than 50 nm.

For the presence of many fine protrusion 2 on the surface of microscopic particle 1, the tip end of the fine protrusion 2 can easily pierce the insulating coat in crimping the crimping part 16 of the crimping terminal 2 on the conductive part 13 of the electric wire 11. Moreover, the size and shape of each microscopic particle 1 mixed and dispersed in the buffer layer 21 is controlled so as to be integrally even. Therefore, welding force in crimping the crimping part 16 on the conductive part 13 affects each microscopic particle 1 uniformly.

The microscopic particle 1 is made from the metal having higher hardness than the insulating coat (such as natural oxide film, corrosion resistance film, and contaminating cover attached in electric wire forming) formed on the surface of the conductive part 13 (hereinafter referred to as "conductor surface"). "The hardness" described in the description may be defined by anyone of Vickers hardness, Brinell hardness, Rockwell hardness, or Shore hardness. The conductive part 13 is made from Al or Aluminum alloy in this embodiment. In this case, the microscopic particle 1 can be made from metal or alloy including at least one of Zn, Cr, Fe, Co, Ni, and Sn. By making the microscopic particle 1 from metal, the microscopic particle 1 itself has the conductivity. Meanwhile, the metal forming the microscopic particle 1 is not limited to thereof. For example, the metal may be a compound that enhances improvement accommodating with further higher hardness or higher corrosion resistance by including P. Also, the microscopic particle 1 may be an inevitable impurity element or Ni containing P.

Figure 3A:
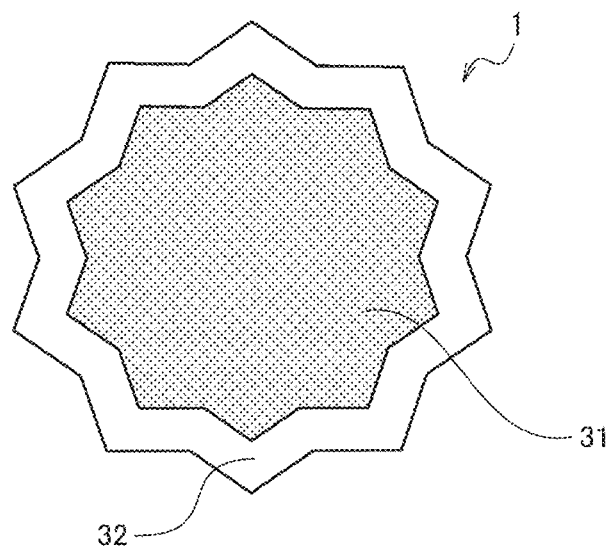
FIG. 3A is a cross sectional view showing an example of a microscopic particle structure according to the embodiments of the present invention.
Figure 3B:
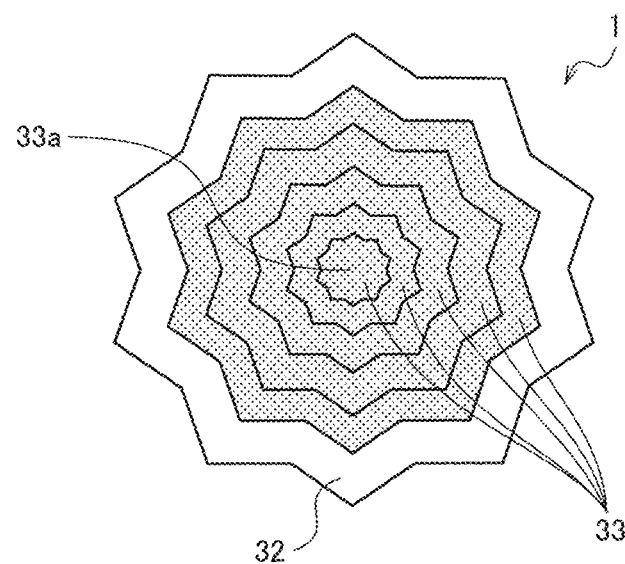
FIG. 3B is a cross sectional view showing the example of the microscopic particle structure according to the embodiments of the present invention.
Figure 4A:
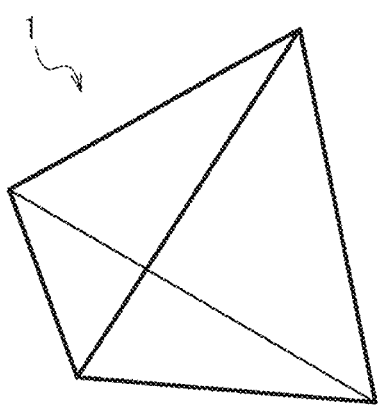
FIG. 4A is an explanation drawing showing another microscopic particle structure according to the embodiments of the present invention.
Figure 4B:
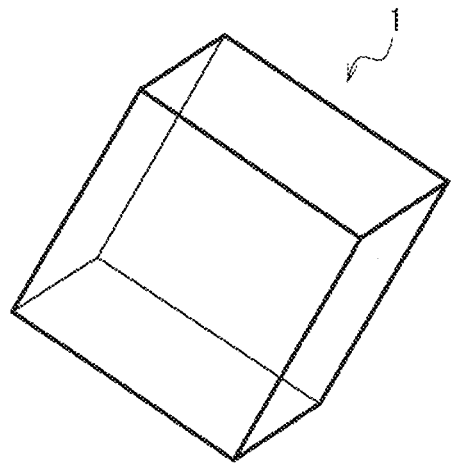
FIG. 4B is an explanation drawing showing the other microscopic particle structure according to the embodiments of the present invention.
Figure 4C:
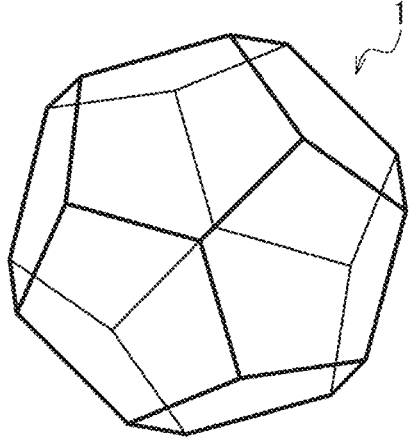
FIG. 4C is an explanation drawing showing the other microscopic particle structure according to the embodiments of the present invention.
Figure 4D:
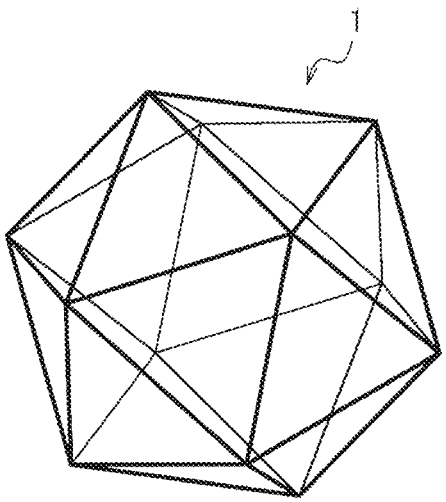
FIG. 4D is an explanation drawing showing the other microscopic particle structure according to the embodiments of the present invention.

As shown in FIGS. 3A, 3B, the microscopic particle 1 described above can have structure comprising a layer structure. The microscopic particle 1 shown in FIG. 3A is the layer structure (multi-layer structure) comprising a core 31 and a coating layer 32 that coats the core 31. For example, the core 31 is made from pure Ni or Ni containing the inevitable impurity element or P. The pure Ni means that the metal whose content rate of Ni is not less than 99 percent by mass. For example, the coating layer 32 is made from Ni—P layer. The coating layer 32 may be made from Ni—P layer whose composition ration between Ni and P is inclined in the thickness direction of the coating layer 32. The thickness direction of the coating layer 32 defines the direction in the radial direction of the microscopic particle 1, that is, the direction from the center of a core 31 toward the surface of the microscopic particle 1 in forming the microscopic particle 1 with spherical shape. In this case, the composition ration between Ni and P may be inclined gradually or integrally.

The core 31 may be made from Ni containing P. The microscopic particle 1 may be formed by coating the core 31 with the coating layer 32 made from Au. Moreover, the microscopic particle 1 may be formed by making the core 31 from Cu and coating the coating layer 32 made from Ni—P with the core 31. Moreover, the core 31 may be made from Cu and the coating layer 32 coating the core 31 may be made from any one of alloy including Sn—Ag—Cu alloy, Sn—Ag alloy, Sn—Bi alloy, Au—Sn alloy, or at least one metal including Au, Sn, Ag, Pd.

The microscopic particle 1 described in FIG. 3B is formed by the coating layer 32 at the topmost surface of the microscopic particle 1 and multi-layer structure 33 inside the microscopic particle 1. The multi-layer structure 33 laminates different metal layers (film) alternatingly from the center 33a of the microscopic particle 1 toward outside (the direction, which the diameter enlarges). For example, the multi-layer structure 33 is formed by laminating Ni layer and Au layer alternatingly from the center 33a toward outside. In this case, a middle layer (an interfacial layer) may be formed between Ni layer and Au layer.

Moreover, the multi-layer 33 can be formed by setting the center 33a layer as the core layer and laminating the different metal layers alternatingly on the outside of the core layer. In this case, for example, each part can be formed by the materials described below. That is, the core layer can be made of Ni or Ni—P. The coating layer 32 can be made of Au. The layer outside of the core layer can be formed by laminating Ni—Au alloy and Ni—P—Au alloy alternatingly. Furthermore, as the other structure, the core layer can be made of Cu and the coating layer 32 can be made of Ni or Ni—P. The layer outside the core layer can be formed by laminating Ni—Cu alloy and Ni—Cu—P alloy alternatingly.

FIGS. 4A to 4D are explanation drawings showing another structure of the microscopic particle according to the embodiments of the present invention. The described microscopic particle 1 is similar to the microscopic particle 1 described in above FIGS. 2A and 3B. However, the microscopic particle 1 has a polyhedral structure instead of the fractal structure according to the structure (the shape). That is, as the examples of the polyhedral structure, the microscopic particle 1 shown in FIG. 4A has tetrahedral structure, the microscopic particle 1 shown in FIG. 4B has hexahedral structure, the microscopic particle 1 shown in FIG. 4C has dodecahedral structure, and the microscopic particle 1 shown in FIG. 4D has icosahedral structure. Meanwhile, each face of the polyhedron is not needed to be similar shape while the microscopic particle 1 has the polyhedral structure. The polyhedral structure may be formed by faces having different shapes.

Local stress in swaging to the conductive part 13, which has significant character in a creep phenomenon, and the crimping terminal 12 can decrease using the microscopic particle 1 having the polyhedral structure. Therefore, uneven change in the conductive part 13 can be controlled and stable connection performance can be remained.

The microscopic particle according to the present invention is not limited to the structure formed by the polyhedron having plane surfaces. The microscopic particle may be formed by the sphere structure or an elliptic structure, which is made from curved surface only, a cylinder structure or a cone (needle) structure, which is made of plane surface and curved surface, or Fulleren structure. The microscopic particle may be made from carbon nanotube. Each structure of microscopic particle may be the multilayer structure or a hollow structure. For the microscopic particle that has the hollow structure, the hollow part of the microscopic particle may be gas sealed or evacuated. Also, the microscopic particle 1 having the fractal structure shown in above FIGS. 2A to 3B may apply the hollow structure that fails to have the core 31. Especially, for using the microscopic particle having the hollow structure, the microscopic particle can be finely crushed as well as swaging the crimping terminal (applying the pressure). Thus, more minimalizing the microscopic particle piercing the insulating coat can be achieved. Therefore, the conductive part 13 of the electric wire 11 can conduct finely and accurately with the crimping part 16 of the crimping terminal 12. As a result, the microscopic particle 1 can contribute to the further stabilization in the electrical connection performance of the electric wire with the crimping terminal 10.

(Elemental Composition of Microscopic Particle)

Elemental composition of the microscopic particle 1 will be explained below. The microscopic particle 1 according to the present embodiments is preferable to be made from a metal or an alloy that includes element having ionization tendency between the element of the conductive part 13 and the element of the crimping terminal 12 (the crimping part 16). Furthermore, the microscopic particle 1 is preferable to be made from a metal or alloy that includes element of which the standard oxidation reduction potential E(V) between hydrated ion and elementary metal in a solution is within the range of −1.7 V to 0.4 V.

For example, as shown in the Table 1 described below, as the conductive part 13 is made of Al and the crimping terminal 12 is made of Cu, the microscopic particle 1 is preferable to be made from the metal including at least one element or the alloy that has the ionization tendency between Al and Cu, that is, Zn, Cr, Fe, Co, Ni, or Sn. As the microscopic particle 1 having such element component is applied, the material made of the element having neutral ionization tendency between the element component of the conductive part 13 and the element component of the crimping terminal 12 is added between the conductive pattern 13 and the crimping terminal 12 by using the microscopic particle 1 having such element component. Since the microscopic particle 1 is interposed into each connecting (contact) part in crimping the crimping terminal 12 on the conductive part 13, the microscopic particle 1 buffers corrosion resistance for water. Therefore, the microscopic particle 1 can increase corrosion resistance, and durability and reliability under humid embodiment.

TABLE 1

|  | Element | Reaction formula | E (V) |
| --- | --- | --- | --- |
| Conductive part | Al | $Al^{3+}(aq) + 3e^- \Leftrightarrow Al(s)$ | −1.676 |
| Microscopic particle | Zn | $Zn^{2+}(aq) + 2e^- \Leftrightarrow Zn(s)$ | −0.7626 |
|  | Cr | $Cr^{3+}(aq) + 3e^- \Leftrightarrow Cr(s)$ | −0.74 |
|  | Fe | $Fe^{2+}(aq) + 2e^- \Leftrightarrow Fe(s)$ | −0.44 |
|  | Co | $Co^{2+}(aq) + 2e^- \Leftrightarrow Co(s)$ | −0.277 |
|  | Ni | $Ni^{2+}(aq) + 2e^- \Leftrightarrow Ni(s)$ | −0.257 |
|  | Sn | $Sn^{2+}(aq) + 2e^- \Leftrightarrow Sn(s)$ | −0.1375 |
| Crimping terminal | Cu | $Cu^{2+}(aq) + 2e^- \Leftrightarrow Cu(s)$ | 0.34 |

(Physics of the Microscopic Particle)

Next, the physics of the microscopic particle will be explained. For the microscopic particle 1 according to the present embodiment, the structure at atomic level (hereinafter referred to as "atomic level structure") has any one of structures from the single crystal structure, the multi crystal structure, and the amorphous structure, or a structure mixing (coexisting) at least two structures from these structures. The mechanical strength (hardness) or the electric conductivity (contact resistance) of the microscopic particle 1 can be controlled according to the application by changing and mixing the atomic level structure of the microscopic particle 1.

The microscopic particle 1 is magnetized. The microscopic particle 1 is preferable to be made from the alloy including one element or at least two elements selected from Fe, Co, Ni in 3d transition metal element, which has relatively large magnetic moment. Furthermore, the magnetism of the microscopic particle 1 may increase by adding one element or at least two elements from rare metal elements into main structure material of the microscopic particle 1. The advantageous of the microscopic particle 1 having the magnetism will be explained below.

[Method of Manufacturing Crimping Terminal]

The method of manufacturing the crimping terminal 12 according to the present invention is at least provided with bending a plate member (on which the connecting part 15 is formed) as the material of the crimping terminal 12 into predetermined shape by forging etc., and forming the buffer layer 21 on the inner surface of the crimping part 16. These two processes may be carried out firstly. As described above, the buffer layer 21 that mixes and disperses the conductive microscopic particle 1 having the fractal structure, which comprises the fine protrusion 2 on the surface, is formed in the process forming the buffer layer 21. The buffer layer 21 is made from the resin, plating, or grease having the waterproofness and the corrosion resistance for the conductive part 13 and the crimping part 16. The detail of the method to form the buffer layer 21 will be explained below.

[The Method of Manufacturing Electric Wire with Crimping Terminal]

Next, the method of manufacturing the electric wire with the crimping terminal will be explained using the crimping terminal 12 obtained by the above method of manufacturing the crimping terminal.

According to the present embodiment, the buffer layer 21 in which the above microscopic particle 1 is mixed and dispersed is previously formed on the inner surface of the crimping part before crimping the crimping terminal 12 on the conductive part 13 of the electric wire 11 by the above method of manufacturing the crimping terminal. The crimping terminal 12 forming the buffer layer 21 is provided and the electric wire 11 of which conductive part 13 is exposed by peeling the end of the coat 14.

Next, as shown in FIGS. 1A to 1C, the conductive part 13 of the electric wire 11 is arranged at the crimping part 16 of the crimping terminal 12 and the end of the coat 14 of the electric wire 11 is arranged at the holding part 17 of the crimping terminal 12. Then, the crimping part 16 of the crimping terminal 12 is crimped with the conductive part 13 of the electric wire 11 by swaging the crimping terminal 12. The holding part 17 of the crimping terminal 12 is attached with the coat 14 of the electric wire 11. In this case, the holding part 17 holds the coat 14 so as to pinch the electric wire 11 from both sides.

As described above, the electric wire with the crimping terminal comprising the below components can be obtained by crimping the crimping part 16 on the conductive part 13. That is, the buffer layer 21 formed by mixing and dispersing the conductive microscopic particle 1 having the fractal structure, which comprises the fine protrusion 2 on the surface, is buffered on the contiguous interface between the conductive part 13 and the crimping part 16. Moreover, the microscopic particle 1 in the buffer layer 21 contacts the conductive part 13 with piercing the insulating coat arranged on the surface of the conductive part 13.

Figure 5A:
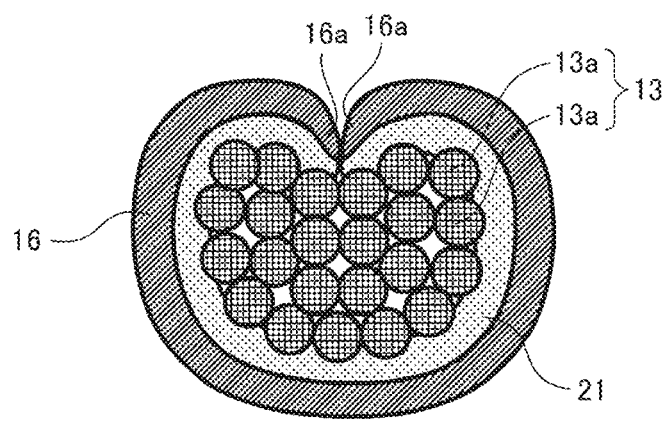
FIG. 5A is a cross sectional view showing a crimped condition between a conductive part and a crimping part.

As shown in FIG. 5A, the microscopic particle 1 in the buffer layer 21 is strongly pressed on the conductive part 13 made from a plurality of strands 13a as the crimping part 16 is crimped by swaging. Thus, although the microscopic particle 1 that is harder than the insulating coat is dispersed in the buffer layer 21, each microscopic particle 1 pierces the insulating coat and intrudes evenly and finely into the base of the conductive part 13 while the conductive part 13 (the strand 13a) has the insulating coat on the surface. Therefore, the crimping part 16 of the crimping terminal 12 can contact certainly and finely with the base of conductive part 13 through the microscopic particle 1 in the buffer layer 21.

As to the crimping terminal 12 forming the buffer layer 21, the pressure by swaging fails to disperse in the contiguous interface between the crimping part 16 and the conductive part 13 through the buffer layer 21 comparing with using conventional formless microscopic particle in which sphere or structure having smooth surface fails to control. Thus, the pressure by swaging applies more convergent to the fine protrusion 2 arranged on the surface of the microscopic particle 1 certainly and finely. Therefore, the pressure in swaging as the load of shear fracture loads effectively on the surface of the insulating coat. That is, the insulating coat coating the surface of the conductive part 13 can be easily pierced. As a result, the microscopic particle 1 finely contacts the conductive part 13 on the large area of the inner surface of the crimping part 16 comparing with the microscopic particle that is conventional sphere shape or fails to control the structure. Therefore, the crimping part 16 can keep stably connection having low electric conductive resistance and is mechanically fine in long time. Moreover, in conventionally arranging the serration (concave-convex pattern) on the inner surface of the crimping terminal, it is necessary to make many types of molding die corresponding to the products or maintain such molding dies. Meanwhile, the present embodiment fails to need. Throughput in the method of manufacturing can be improved.

Figure 5B:
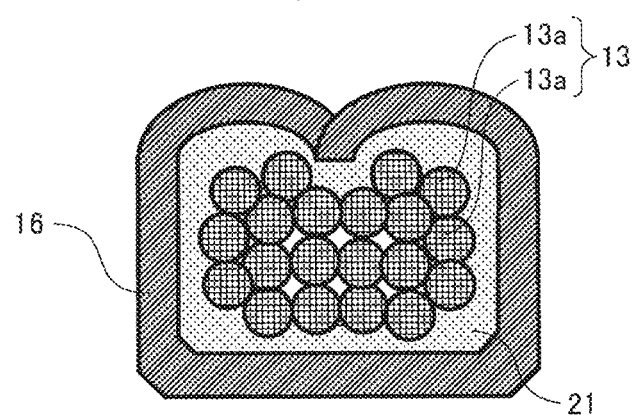
FIG. 5B is a cross sectional view showing the crimped condition between the conductive part and the crimping part.

One pair of side walls 18 and the lower wall 19 forms the crimping part 16 into almost U-shape in the state before crimping shown in FIG. 1C. Meanwhile, two ends (16*a*) of the crimping part 16 intrude with curving into the conductive part 13 side. The crimping part 16 covers the conductive part 13 from the tip ends (16*a*) of intruding to the both side walls and further the lower walls using a continuous curvature. Therefore, the buffer layer 21 surrounds whole along the conductive part 13. Meanwhile, the shape of the crimping part 16 after crimping (swaging) is not limited to. For example, as shown in FIG. 5B, two ends of the crimping part (16*a*) may intrude into the conductive part 13 side with curving, and the end of crimping part 16*a* may coat the conductive part 13 by using curvature from two tip ends (16*a*) of the crimping part 16 to the upper end of the left and right side walls 18 and plane for the bottom (the side walls and the lower walls).

The structure of the crimping terminal may only comprises the connecting part and the crimping part except the structure comprising the above connecting part 15, the crimping part 16, and the holding part 17. It will be explained specifically by using FIGS. 6A to 6C.

Figure 6A:
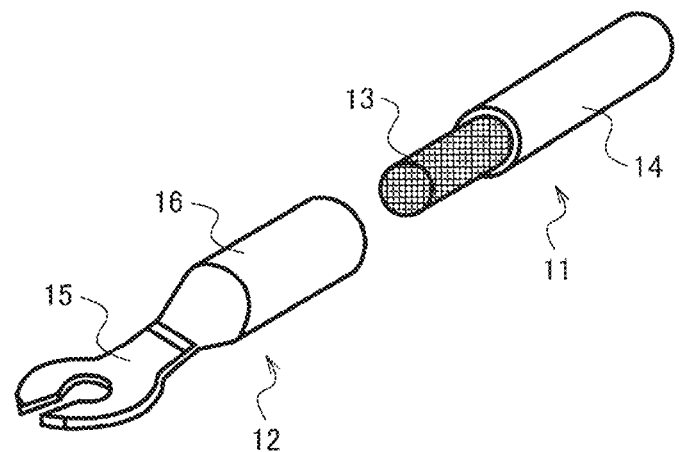
FIG. 6A is an exploded perspective view showing the crimping terminal and the electric wire with the crimping terminal before crimping according to the embodiments of the present invention.
Figure 6B:
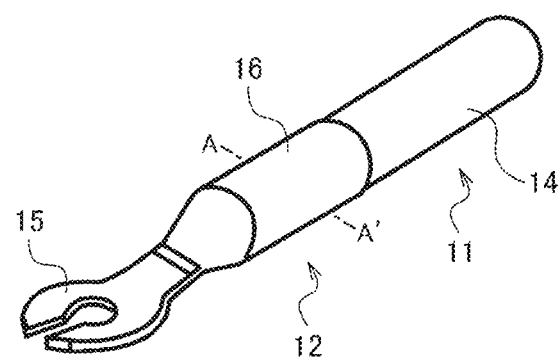
FIG. 6B is a perspective view showing the crimping terminal and the electric wire with the crimping terminal according to the embodiments of the present invention, which the crimping terminal is loaded on the electric wire.
Figure 6C:
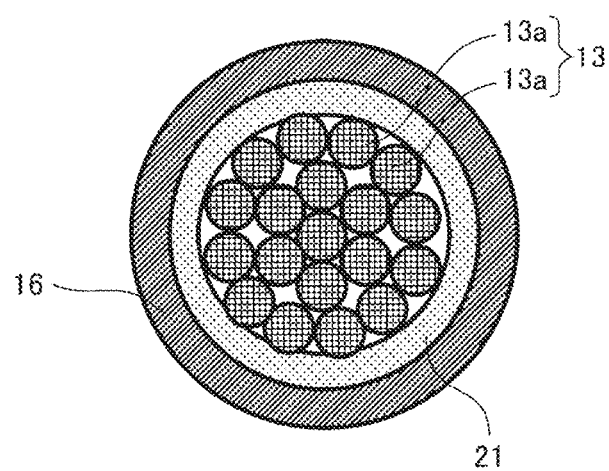
FIG. 6C is a cross sectional view cut along with the line A-A' in FIG. 6B.

FIG. 6A is an exploded perspective view showing the crimping terminal and the electric wire with the crimping terminal before crimping according to the embodiments of the present invention. FIG. 6B is a perspective view showing the crimping terminal and the electric wire with the crimping terminal according to the embodiments of the present invention, which the crimping terminal is loaded on the electric wire. FIG. 6C is a cross sectional view cut along with the line A-A' in FIG. 6B;

The method of manufacturing the crimping terminal includes at least the process forming the buffer layer 21 on the inner surface (inner peripheral surface) of the crimping part 16 formed cylindrically. In forming the buffer layer 21 on the inner surface of the crimping part 16, for example, the grease (compound) combining the conductive microscopic particle 1 is coated on the whole inner surface of the crimping part 16. Thus, the crimping terminal 12 having the buffer layer 21 can be obtained.

Next, the crimping terminal 12 obtained by the above method of manufacturing is attached on the conductive part 13 of the electric wire 11. In this case, the conductive part 13 of the electric wire 11 is intruded into a cylinder of the crimping part 16 of the crimping terminal 12. As shown in FIG. 6C, the whole circumference around the conductive part 13 is surrounded by the buffer layer 21. The crimping part 16 in the crimping terminal 12 crimps the conductive part 13 of the electric wire 11 by swaging the crimping terminal 12. Therefore, the electric wire with the crimping terminal can be obtained.

Figure 5C:
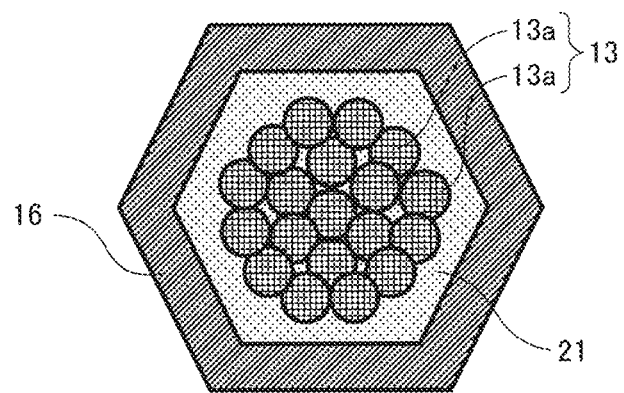
FIG. 5C is a cross sectional view showing the crimped condition between the conductive part and the crimping part.

As forming the crimping part 16 in the crimping terminal 12 cylindrically and forming the buffer layer 21 on the inner surface of the crimping part 16, as shown in FIG. 5C, a cross sectional shape of the crimped (swaged) crimping part 16 can be a hexagon shape. Meanwhile, the cross sectional shape of the crimped crimping part 16 may be a polygonal shape except the hexagonal shape, elliptical shape, or circular shape, further, the shape combining the curvature and the plane. Furthermore, in swaging the cylindrical crimping part 16, it is not limited to swage (press) the whole part of the outer surface of the crimping part 16. A part of the outer surface of the crimping part 16 may be swaged so as to be rough along the longitudinal direction of the electric wire 11 and the surface of the conductive part 13 may be pressed corresponding to the concavo-convex state.

As the above structure is applied, the microscopic particle 1 in the buffer layer 21, which is arranged on the whole side of the conductive part 13 exposed from the coat 14, can pierce the insulating coat on the surface of the conductive part 13. Thus, the whole conductive part 13 can be electrically connected to the whole crimping part 16. Therefore, the electric wire 11 can connect with the crimping terminal 12 with substantially low electrical resistance. Furthermore, the microscopic particle 1 can intrude into the base of the conductive pattern 13 in the whole conductive part 13. Therefore, the crimping part 16 can keep evenly the mechanical connecting strength between the electric wire 11 and the crimping terminal 12 in the whole circumferential direction and provide the stable connecting status without depending the direction.

In this case, the buffer layer is formed on the inner surface of the crimping part 16 by coating the grease (in which the microscopic particle is combined) on the inner surface of the crimping part 16 of the crimping terminal 12. It is not limited to thereof. The buffer layer 21 may be formed on the surface of the conductive part 13 by coating the above grease on the surface of the conductive part 13 (the outer peripheral surface) exposed from the coat 14.

In this case, the buffer layer 21 is previously formed on the inner surface of the crimping part 16 of the crimping terminal 12. It is not limited to thereof. The buffer layer can be formed in the predetermined shape (such as sheet shape, sleeve shape, cap shape) separately from the crimping terminal. The methods of manufacturing the electric wire with the crimping terminal will be explained separated into the buffer layer shapes.

(Forming Buffer Layer in Sheet Shape)

Figure 7A:
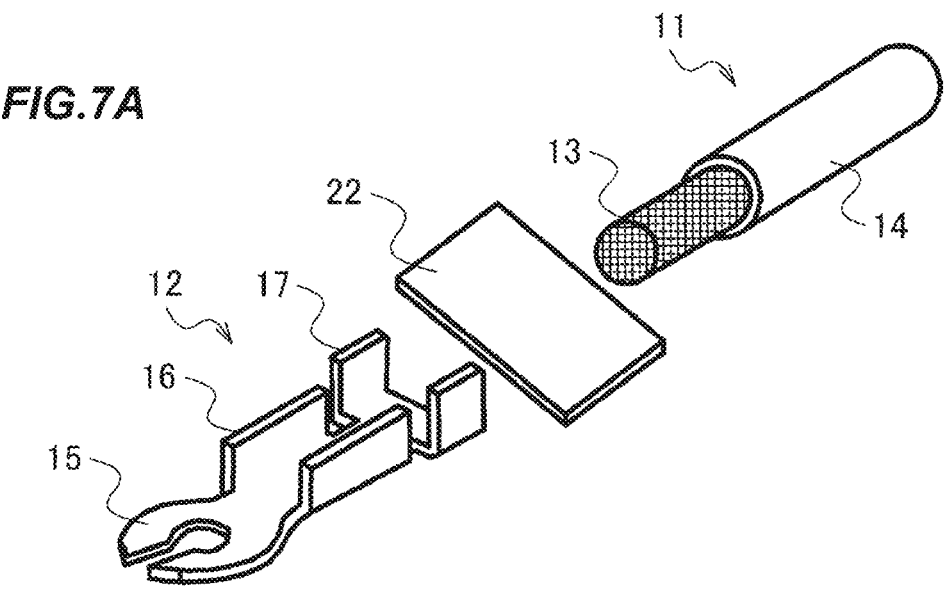
FIG. 7A is an exploded perspective view showing a method of manufacturing the electric wire with the crimping terminal before crimping whose buffer layer is formed in a sheet shape.
Figure 7B:
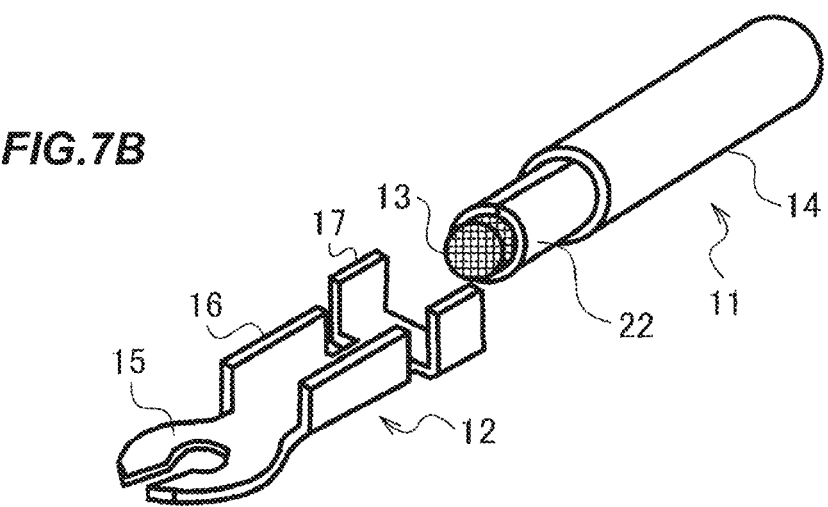
FIG. 7B is a perspective view showing the method of manufacturing the electric wire with the crimping terminal whose buffer layer is formed in the sheet shape and loaded on the conductive part.
Figure 7C:
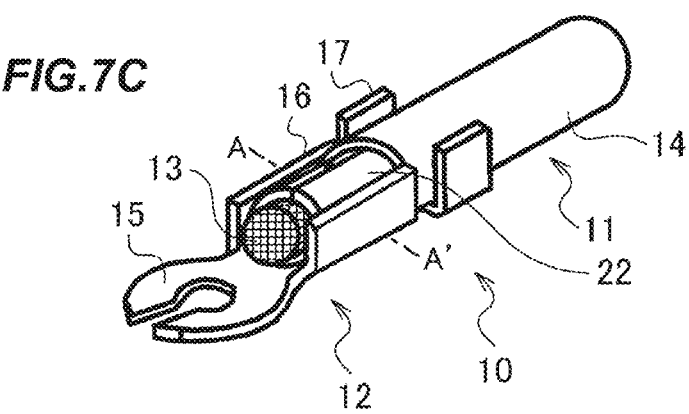
FIG. 7C is a perspective view showing the method of manufacturing the electric wire with the crimping terminal whose buffer layer is formed in the sheet shape, which the crimping terminal is loaded on the electric wire.
Figure 7D:
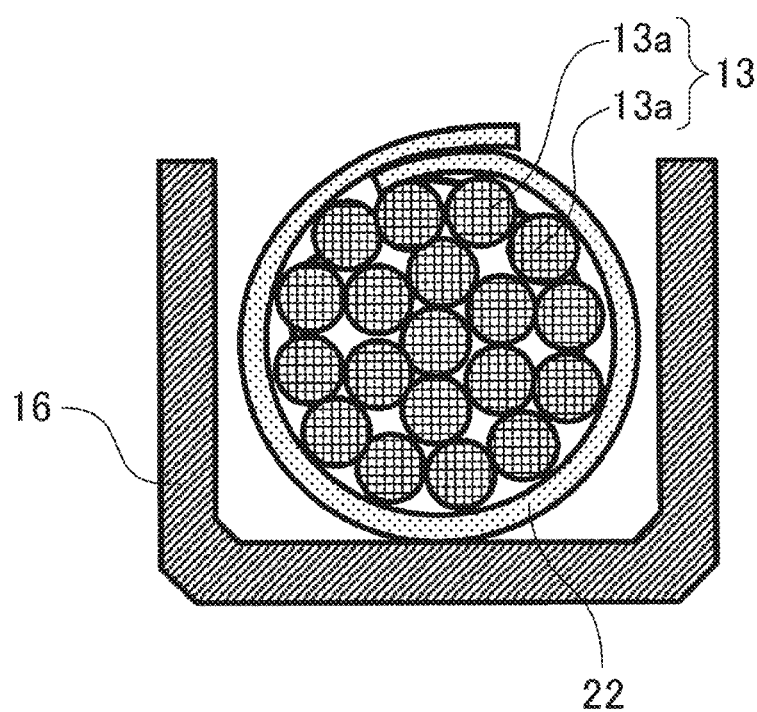
FIG. 7D is a cross sectional view cut along with the line A-A' in FIG. 7C.

FIG. 7A is an exploded perspective view showing a method of manufacturing the electric wire with the crimping terminal before crimping whose buffer layer is formed in a sheet shape. FIG. 7B is a perspective view showing the method of manufacturing the electric wire with the crimping terminal whose buffer layer is formed in the sheet shape and loaded on the conductive part. FIG. 7C is a perspective view showing the method of manufacturing the electric wire with the crimping terminal whose buffer layer is formed in the sheet shape, which the crimping terminal is loaded on the electric wire. FIG. 7D is a cross sectional view cut along with the line A-A' in FIG. 7C.

This method of manufacturing the electric wire with the crimping terminal is provided with a first process to form the buffer layer 22 by mixing and dispersing the conductive microscopic particle having the fractal structure, which comprises the fine protrusion on the surface, in the sheet shape, and a second process to crimp the crimping part 16 on the conductive part 13 with attaching the buffer layer 22 obtained by the first process on the conductive part 13.

The sheet shape buffer layer 22 as shown in FIG. 7A is provided in the first process. The buffer layer 22 is formed in a rectangular shape having uniform thickness in a plan view. The buffer layer 22 is formed flatly. Meanwhile, the buffer layer 22 has flexible character in shape.

For example, the buffer layer 22 can be formed by the below process in using resin into the structure material as the base layer of the buffer layer 22. Firstly, many microscopic particles 1 shown in FIGS. 2A to 4D are mixed into a resin material (binder) that is liquidity or pasty and each microscopic particle 1 is evenly dispersed in the resin material. Next, the resin material is cut into individual sheet corresponding to the predetermined size and shape after forming the resin material into a large size shape. Therefore, the sheet shape buffer layer 22 can be obtained.

In the second process, firstly, as shown in FIG. 7B, the buffer layer 22 is attached on the conductive part 13 by wrapping the sheet shape buffer layer 22 obtained by the above first process on the conductive part 13 of the electric wire 11. Both ends of the buffer layer 22 should be wrapped as shown in FIG. 7D so as not to make a space between a wrapping start edge and a wrapping end edge.

Next, as shown in FIG. 7C, the conductive part 13 on which the buffer layer 22 is attached is arranged in the crimping part 16 in the crimping terminal 12 and the coat 14 of the electric wire 11 is arranged in the holding part 17 of the crimping terminal 12. Then, the crimping part 16 of the crimping terminal 12 crimps the conductive part 13 of the electric wire, and the holding part 17 of the crimping terminal 12 is attached in the coat 14 of the crimping terminal 12 while the crimping terminal 12 is swaged. Therefore, the electric wire with the crimping terminal 10 can be obtained.

As the above method of manufacturing is applied, a special additional process such as forming the buffer layer 21 on the crimping terminal 12 by plating is not needed. The conventional crimping terminal can be used. Moreover, as the process has only wrapping the sheet shape buffer layer 22 directly on the conductive part 13, an increase of the cost in manufacturing can be controlled.

(Forming Buffer Layer in Sleeve Shape)

Figure 8A:
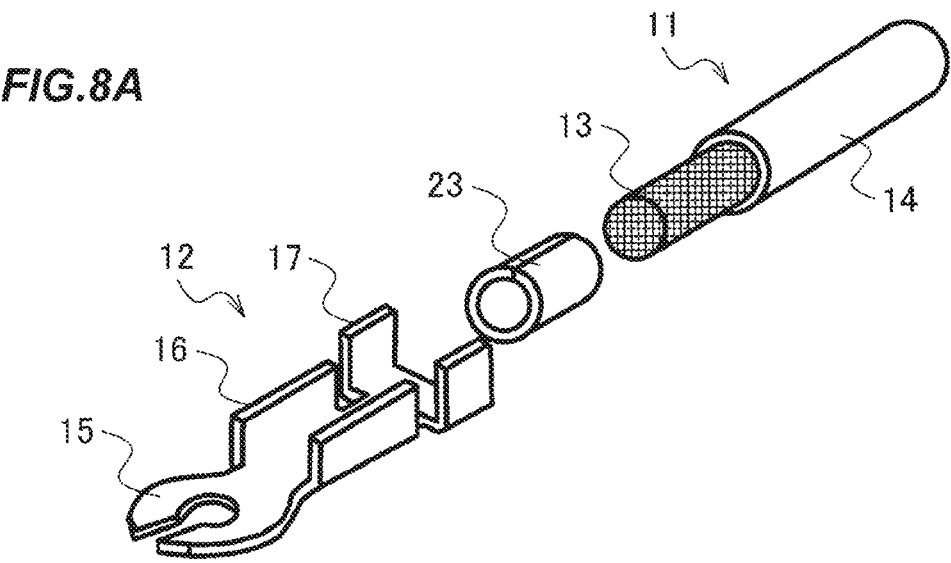
FIG. 8A is an exploded perspective view showing a method of manufacturing the electric wire with the crimping terminal before crimping whose buffer layer is formed in a sleeve shape.
Figure 8B:
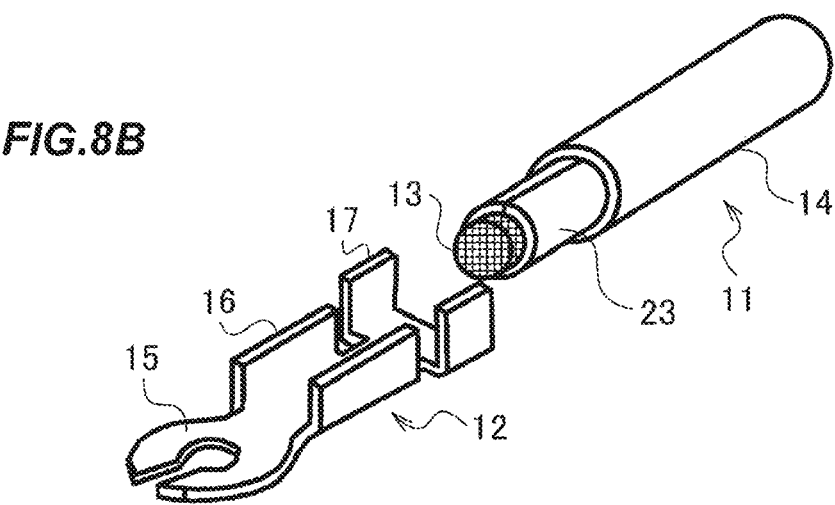
FIG. 8B is a perspective view showing the method of manufacturing the electric wire with the crimping terminal whose buffer layer is formed in the sleeve shape and loaded on the conductive part.
Figure 8C:
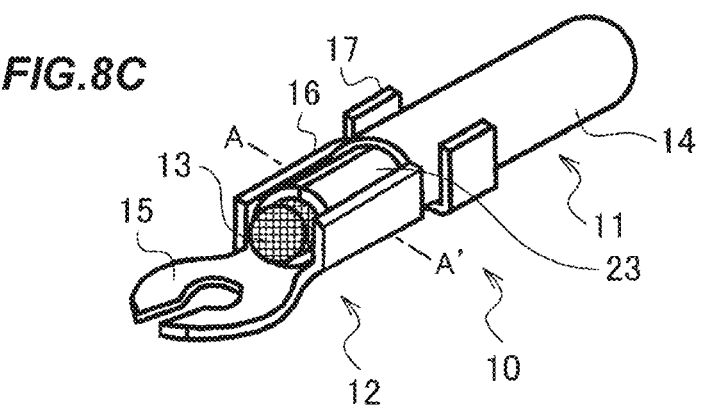
FIG. 8C is a perspective view showing the method of manufacturing the electric wire with the crimping terminal whose buffer layer is formed in the sleeve shape, which the crimping terminal is loaded on the electric wire.
Figure 8D:
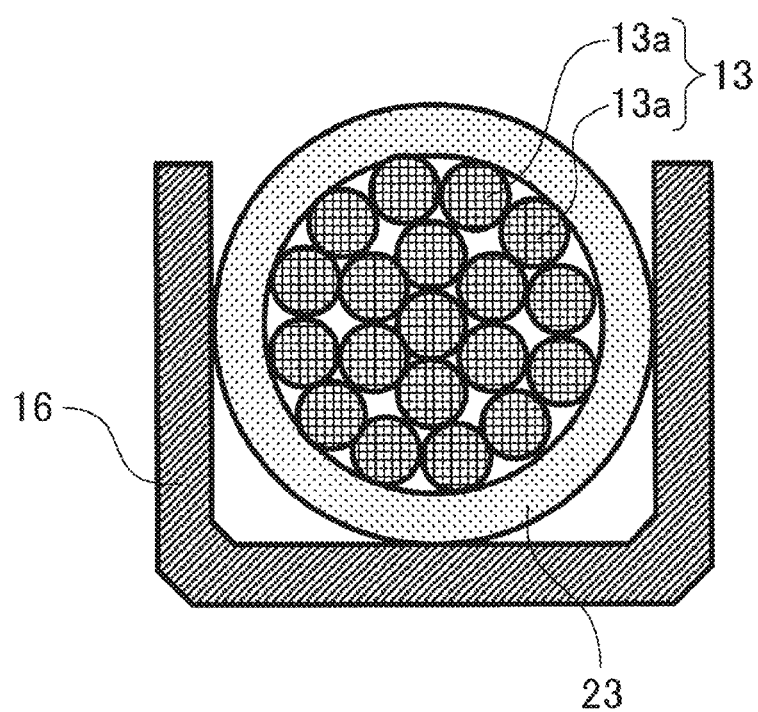
FIG. 8D is a cross sectional view cut along with the line A-A' in FIG. 8C.

FIG. 8A is an exploded perspective view showing a method of manufacturing the electric wire with the crimping terminal before crimping whose buffer layer is formed in a sleeve shape. FIG. 8B is a perspective view showing the method of manufacturing the electric wire with the crimping terminal whose buffer layer is formed in the sleeve shape and loaded on the conductive part. FIG. 8C is a perspective view showing the method of manufacturing the electric wire with the crimping terminal whose buffer layer is formed in the sleeve shape, which the crimping terminal is loaded on the electric wire. FIG. 8D is a cross sectional view cut along with the line A-A' in FIG. 8C.

This method of manufacturing the electric wire with the crimping terminal is provided with a first process to form the buffer layer 23 by mixing and dispersing the conductive microscopic particle having the fractal structure, which comprises the fine protrusion on the surface, in the sleeve shape, and a second process to crimp the crimping part 16 on the conductive part 13 with attaching the buffer layer 23 obtained by the first process on the conductive part 13.

The sleeve shape buffer layer 23 as shown in FIG. 8A is provided in the first process. The buffer layer 23 is formed in a cylindrical shape having uniform thickness. Inside of the buffer layer 23 (cylindrical inside) performs as a through hole so as to intrude the conductive part 13. One side of entrance of the through hole is cylindrical shape opening. And opposite side of the through hole is also cylindrical shape opening. Inner diameter of the buffer layer 23 is uniform from the one side to the opposite side in the central axis direction of the buffer layer 23. Moreover, the inner surface of the buffer layer 23 is set slightly larger than the outer surface of the conductive part 13 in the electric wire 11.

For example, the buffer layer 23 can be formed by the below process in using resin into the structure material that is the base layer of the buffer layer 23. Firstly, many microscopic particles 1 shown in FIGS. 2A to 4D are mixed into the resin material that is liquidity or pasty and each microscopic particle 1 is evenly dispersed in the resin material. Next, the resin material is cut into individual sheet corresponding to the predetermined size and shape after forming the resin material into the cylindrical shape. Therefore, the sleeve shape buffer layer 23 can be obtained.

In the second process, firstly, as shown in FIG. 8B, the sleeve shape buffer layer 23 obtained in the first process is attached on the conductive part 13 by fitting the buffer layer 23 into the conductive part 13 of the electric wire 11. If necessary, the conductive part 13 may fit into the buffer layer 23 after coating the grease etc. on the surface of the conductive part 13.

Next, as shown in FIG. 8C, the conductive part 13 on which the buffer layer 23 is attached is arranged in the crimping part 16 of the crimping terminal 12, and the coat 14 of the electric wire 11 is arranged in the holding part 17 of the crimping terminal 12. Then, the crimping part 16 of the crimping terminal 12 crimps the conductive part 13 of the electric wire 11, and the holding part 17 of the crimping terminal 12 is attached in the coat 14 of the crimping terminal 12 while the crimping terminal 12 is swaged. Therefore, the electric wire with the crimping terminal 10 can be obtained.

As the above method of manufacturing is applied, the buffer layer 23, in which the microscopic particles 1 having the fractal structure is mixed and dispersed, can be evenly and fitly arranged on the whole side surface (whole surface) of the conductive part 13, the pressure in crimping can be forced to the crimping part 16 evenly. As a result, frequency of poor connection at the crimping terminal 12 can decrease and the electric wire with the crimping terminal can be manufactured (yield) with high yield rate.

(Forming Buffer Layer in Cap Shape)

Figure 9A:
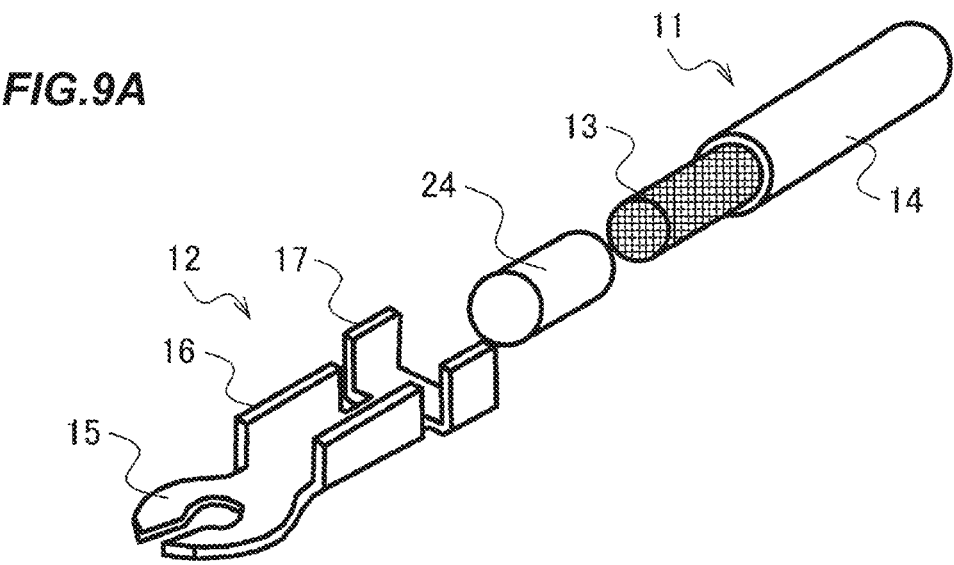
FIG. 9A is an exploded perspective view showing a method of manufacturing the electric wire with the crimping terminal before crimping whose buffer layer is formed in a cap shape.
Figure 9B:
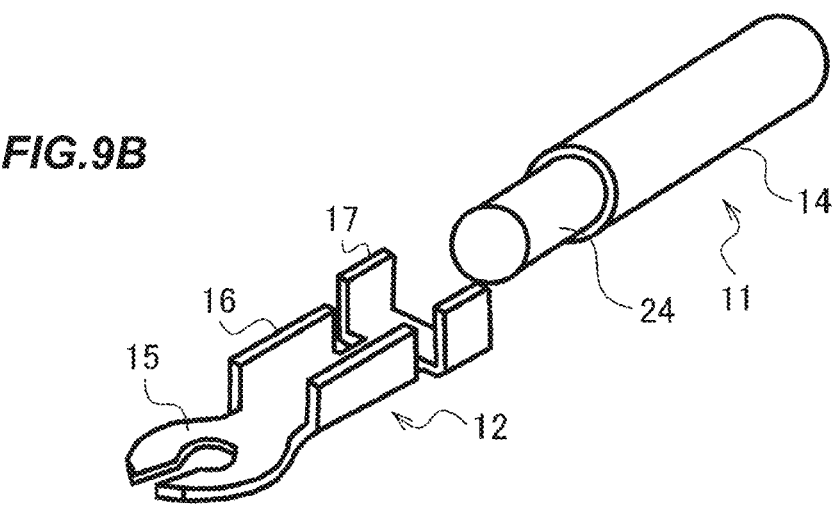
FIG. 9B is a perspective view showing the method of manufacturing the electric wire with the crimping terminal whose buffer layer is formed in the cap shape and loaded on the conductive part.
Figure 9C:
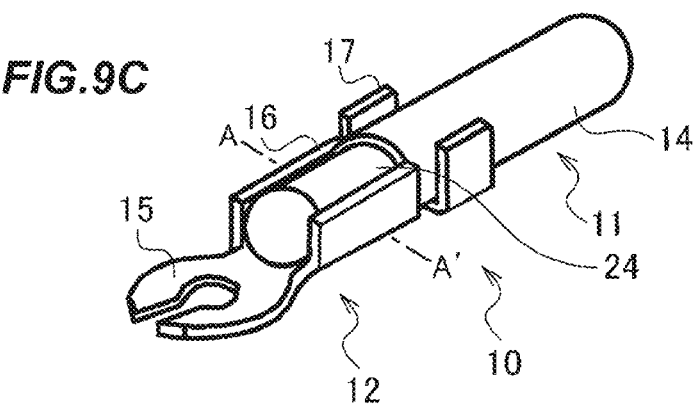
FIG. 9C is a perspective view showing the method of manufacturing the electric wire with the crimping terminal whose buffer layer is formed in the cap shape, which the crimping terminal is loaded on the electric wire.
Figure 9D:
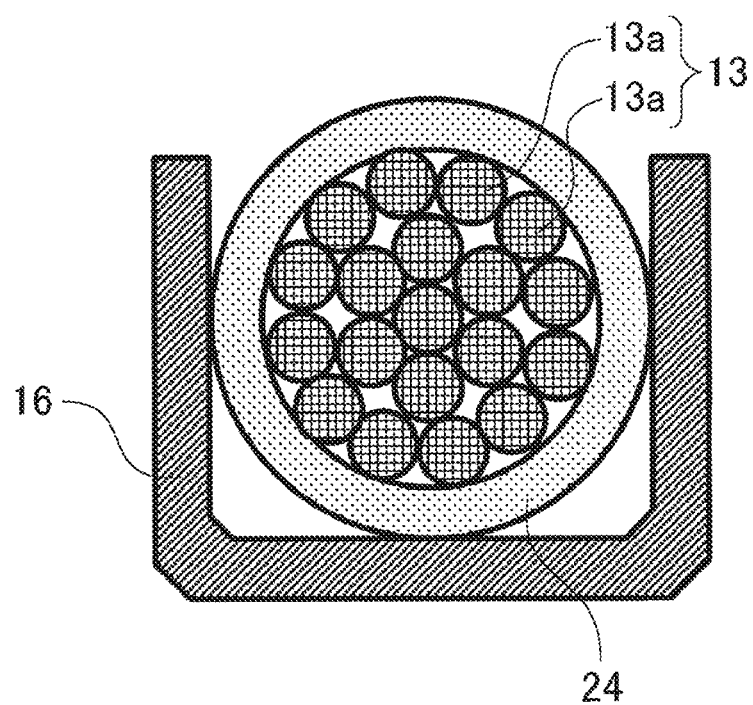
FIG. 9D is a cross sectional view cut along with the line A-A' in FIG. 9C.

FIG. 9A is an exploded perspective view showing a method of manufacturing the electric wire with the crimping terminal before crimping whose buffer layer is formed in a cap shape. FIG. 9B is a perspective view showing the method of manufacturing the electric wire with the crimping terminal whose buffer layer is formed in the cap shape and loaded on the conductive part. FIG. 9C is a perspective view showing the method of manufacturing the electric wire with the crimping terminal whose buffer layer is formed in the cap shape, which the crimping terminal is loaded on the electric wire. FIG. 9D is a cross sectional view cut along with the line A-A' in FIG. 9C.

This method of manufacturing the electric wire with the crimping terminal is provided with a first process to form the buffer layer 24 by mixing and dispersing the conductive microscopic particle having the fractal structure, which comprises the fine protrusion on the surface, in the cap shape, and a second process to form the crimping part 16 on the conductive part 13 with attaching the buffer layer 24 obtained by the first process on the conductive part 13.

The cap shape buffer layer 24 as shown in FIG. 9A is provided in the first process. The cross section of the buffer layer 24 is formed in a circular shape having uniform thickness. One side of the buffer layer 24 in the central axis direction is closed. And the other side of the buffer layer 24 in the central axis direction is the cylindrical shape having the opening. Inside of the buffer layer 23 (cylindrical inside of the buffer layer 23) performs as a non-through hole so as to intrude the conductive part 13. The entrance of the non-through hole is the cylindrical opening. Inner diameter of the buffer layer 24 is uniform from the one side to the opposite side in the central axis direction of the buffer layer 24. Moreover, the inner surface of the buffer layer 24 is set slightly larger than the outer surface of the conductive part 13 of the electric wire 11.

For example, the buffer layer 24 can be formed by the below process in using resin into the structure material that is the base layer of the buffer layer 24. Firstly, many microscopic particles 1 shown in FIGS. 2A to 4D are mixed into the resin material that is liquidity or pasty and each microscopic particle 1 is evenly dispersed in the resin material. Next, the buffer layer 24 can be obtained by forming the resin material into the cap shape.

In the second process, firstly, as shown in FIG. 9B, the cap shape buffer layer 24 is attached on the conductive part 13 by fitting the conductive part 13 of the electric wire 11 into the cap shape buffer layer 24. If necessary, the conductive part 13 may be fit into the buffer layer 24 after coating the grease etc. on the surface of the conductive part 13.

Next, as shown in FIG. 9C, the conductive part 13, which the buffer layer 23 is attached on, is arranged in the crimping part 16 of the crimping terminal 12. And the coat 14 of the electric wire 11 is arranged in the holding part 17 of the crimping terminal 12. Then, the crimping part 16 of the crimping terminal 12 crimps the conductive part 13 of the electric wire by swaging the crimping terminal 12. The holding part 17 of the crimping terminal 12 is attached in the coat 14 of the crimping terminal 12. Therefore, the electric wire with the crimping terminal 10 can be obtained.

As the above method of manufacturing is applied, the cap shape buffer layer 24 can cover whole exposed conductive part 13, which includes a tip end surface of the conductive part 13, exposed from the coat 14. The cap shape buffer layer 24 coats (shields) whole exposed part of the conductive part 13, which includes the tip end surface of the conductive part 13. The crimping part 16 is crimped on the conductive part 13 through the buffer layer 24. Therefore, the buffer layer 24 prevents liquid such as water from entering into the conductive part 13. Therefore, electric corrosion in the conductive part 13 caused by water can be prevented effectively. Furthermore, the microscopic particles 1 in the buffer layer 24 can be uniformly and fitly arranged at substantially predetermined position on the junction surface of the conductive part 13 with the crimping part 16 of the crimping terminal 2. As a result, the life time and reliability of the electric wire with the terminal in operation can increase. Furthermore, crimping the crimping part 16 on the conductive part 13 can process reproductively. The electric wire with the terminal can product stably.

In attaching the buffer layer 23, which is formed in the sleeve shape, on the conductive part 13, the buffer layer 23 may fail to fit into the conductive part 13 smoothly by catching the opening edge of the buffer layer 23 by the end surface of the conductive part 13 as the size difference between the inner diameter of the buffer layer 23 and the outer diameter of the conductive part 13 is small. Thus, efficient in fitting process may reduce. It is similar in fitting the buffer layer 24 that is formed in the cap shape on the conductive part 13. In such case, it is preferable to apply the below structure.

Figure 10A:
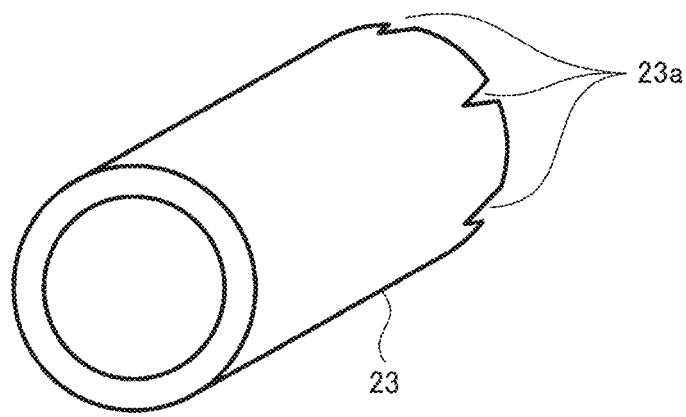
FIG. 10A is a perspective view showing an example of a sleeve shape buffer layer structure.
Figure 10B:
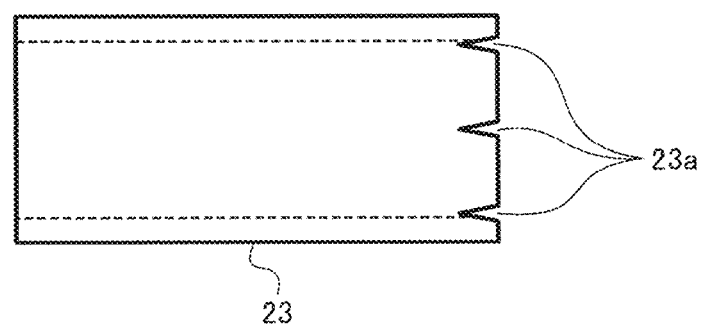
FIG. 10B is a side view showing the example of the sleeve shape buffer layer structure.
Figure 10C:
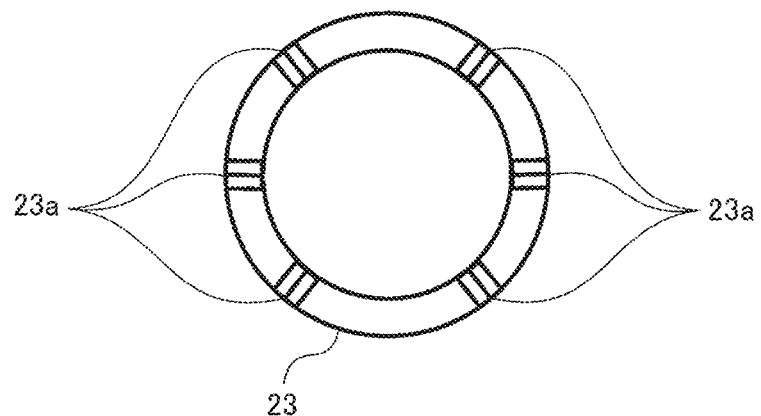
FIG. 10C is a front view showing the example of the sleeve shape buffer layer structure.

As shown in FIGS. 10A to 10C, a slit 23a is formed at an entrance side opening of the buffer layer 23 before forming the buffer layer 23 in the sleeve shape. "The entrance side" described in this description means the side of conductive part 13 into which is firstly intruded in fitting the conductive part 13 into the buffer layer 23. Although the sleeve shape buffer layer 23 has the single openings at each side of the buffer layer 23 in the central axis direction, one side opening of the buffer layer 23 is opposite to the tip of the conductive part 13 in attaching the buffer layer 23 on the conductive part 13. In this case, the one side opening is the entrance side opening. And the other side opening is the opposite side opening. A plurality of slits 23a is arranged on the buffer layer 23 in the circumferential direction at an equal angle interval (in this case, six slits 23a). Each slit 23a is formed by partly cutting an entrance side opening edge of the buffer layer 23 in a wedge shape. Each slit 23a is cut in the central axis direction of the buffer layer 23.

An opening diameter at the entrance side buffer layer 23 can be artificially large by arranging the slit 23a on the entrance side opening of the buffer layer 23. That is, the plurality of slit 23a can extend the opening diameter of the entrance side buffer layer 23. Therefore, although the difference between the inner diameter of the buffer layer 23 and the outer diameter of the conductive part 13 is small, the conductive part 13 can be fit (intruded) into the entrance side opening of the buffer layer 23 easily. As a result, efficient in fitting process to attach the buffer layer 23 on the conductive part 13 may increase and a high production throughput can be achieved.

Figure 11A:
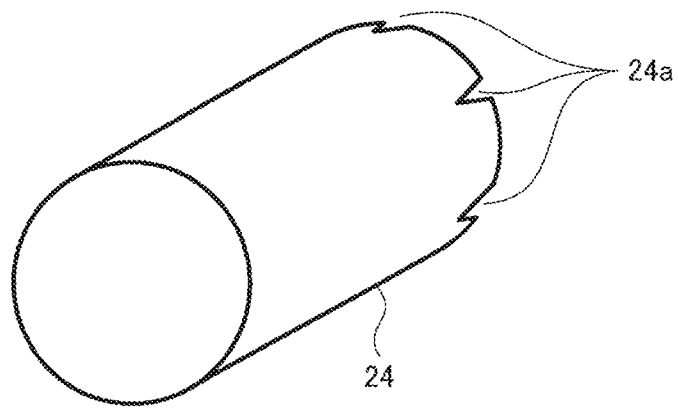
FIG. 11A is a perspective view showing an example of a cap shape buffer layer structure.
Figure 11B:
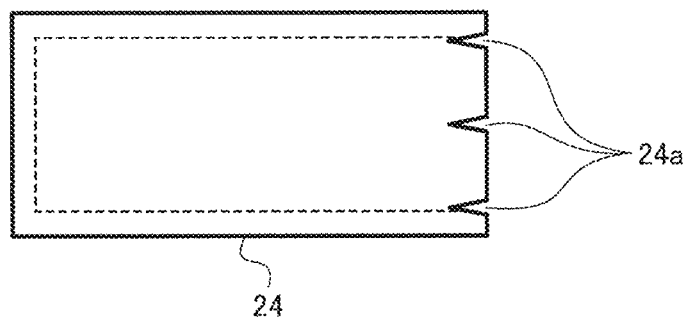
FIG. 11B is a side view showing the example of the cap shape buffer layer structure.
Figure 11C:
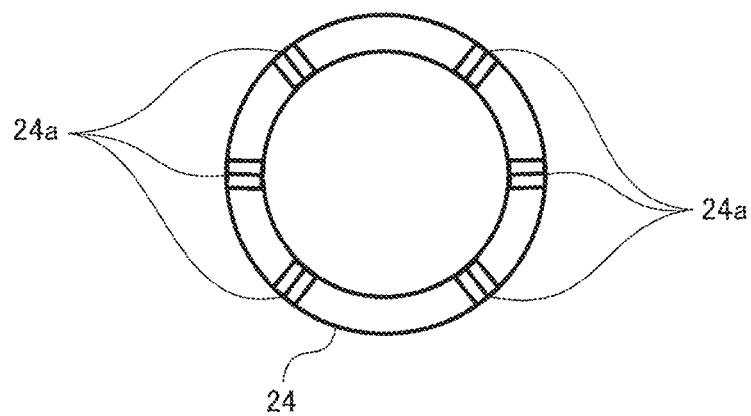
FIG. 11C is a front view showing the example of the cap shape buffer layer structure.

As shown in FIGS. 11A to 11C, the similar effect described above can be obtained by arranging a slit 24a on the entrance side opening of the buffer layer 24 in forming the buffer layer 24 in the cap shape.

Figure 12A:
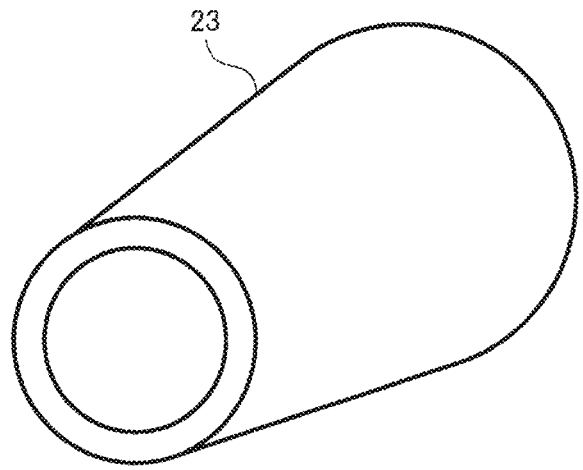
FIG. 12A is a perspective view showing another structure example of the sleeve shape buffer layer.
Figure 12B:
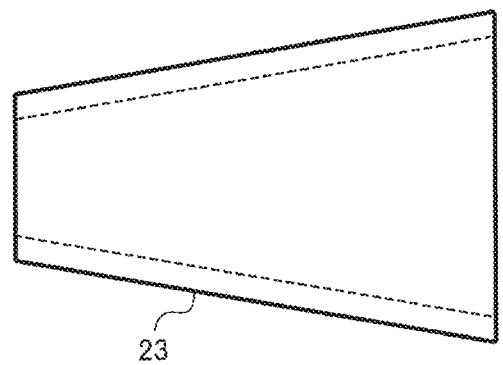
FIG. 12B is a side view showing another structure example of the sleeve shape buffer layer.
Figure 12C:
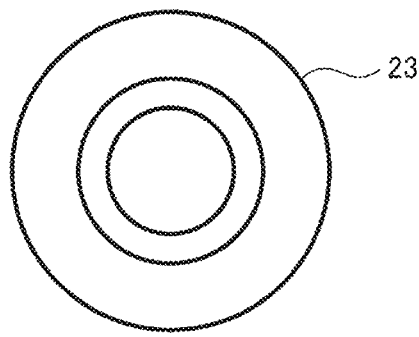
FIG. 12C is a front view showing another structure example of the sleeve shape buffer layer.

As shown in FIGS. 12A to 12C, the buffer layer 23 may be formed such that the inner diameter of the buffer layer 23 decreases gradually from the entrance side (the right side shown in FIG. 12B) toward the opposite side (the left side shown in FIG. 12B) in forming the buffer layer 23 in the sleeve shape. In such case, the opening diameter of the entrance side buffer layer 23 should be set larger than the outer diameter of the conductive part 13. And the opposite side opening diameter should be set as large as the outer diameter of the conductive part 13.

As the inner diameter of the sleeve shape buffer layer 23 is set as with the described above, the entrance side opening of the buffer layer 23 opens larger than the outer diameter of the conductive part 13 intruded into the opening. Although the grease etc. fails to be coated on the surface of the conductive part 13, the conductive part 13 is intruded into the opposite side of the buffer layer 23 smoothly with reducing friction between the buffer layer 23 and the conductive part 13. Therefore, the efficient (throughput) in attaching process of the buffer layer 23 can increase without intuition of the operator or precise control in an assemble machine.

Figure 13A:
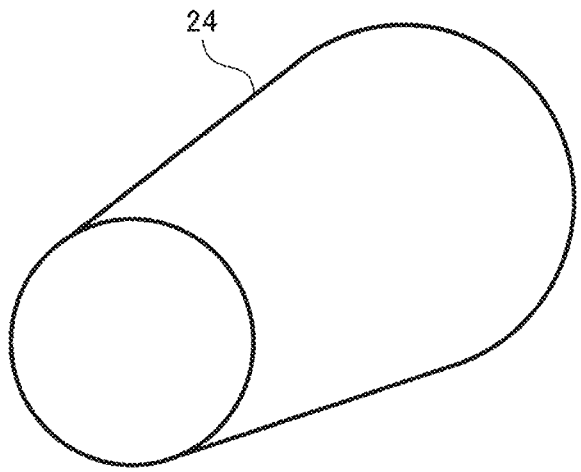
FIG. 13A is a perspective view showing another structure example of the cap shape buffer layer.
Figure 13B:
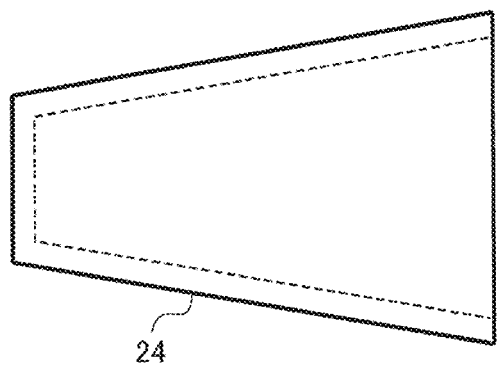
FIG. 13B is a side view showing another structure example of the cap shape buffer layer.
Figure 13C:
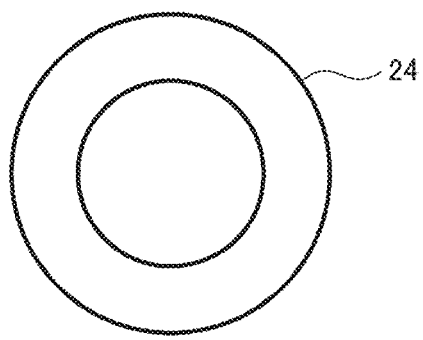
FIG. 13C is a front view showing another structure example of the cap shape buffer layer.

Furthermore, as shown in FIGS. 13A to 13C, the similar effect as with the effect described above can be obtained by forming the inner diameter of the buffer layer 24 so as to decrease gradually from the entrance side toward the opposite side in forming the buffer layer 24 in the cap shape.

Figure 14A:
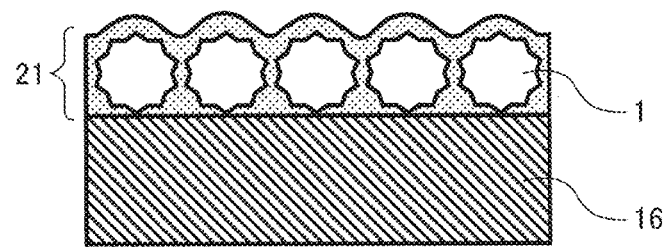
FIGS. 14A to 14C are explanation diagrams showing an example of connection between the conductive part and the crimping part through the large diameter microscopic particles.
Figure 14B:
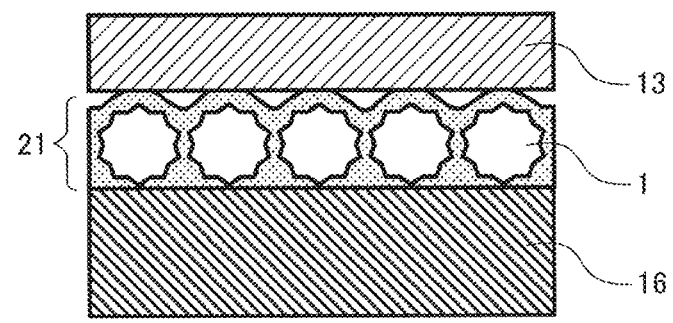
Figure 14C:
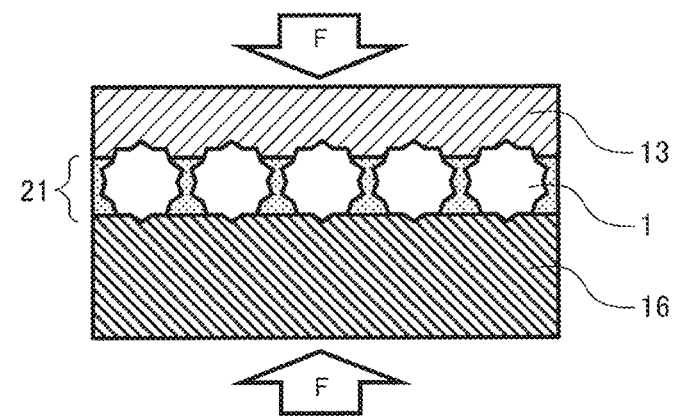

A article size mixed in the buffer layer is preferable to change corresponding to the state of electric wire 11 comprising the conductive part 13 such as contamination or roughness on the conductor surface caused by extension of wire or exposure in long time, or material (such as hardness) of the conductor base. For example, as the same force is applied in swaging, the microscopic particle size is preferable to increase so as to pierce the insulating coat certainly by intruding the microscopic particle while the insulating coat of the conductor surface has thin thickness or the conductor base is soft. Especially, as shown in FIGS. 14A to 14C, it is preferable to mix and disperse the large size microscopic particle 1 having the fractal structure, which has the fine protrusion on the surface, into the buffer layer 21, and connect the conductive part 13 with the crimping part 16 through the buffer layer 21 by crimping. As shown in FIG. 14A, the buffer layer 21 in which a plurality of (many) large size microscopic particles 1 is mixed and dispersed is formed on the crimping part 16. As shown in FIG. 14B, the conductive part 13 is arranged above the crimping part 16 through the buffer layer 21. As shown in FIG. 14C, the force caused by swaging is applied to the crimping part 16 and the conductive part 13 from the arrow direction F. Thus, the large size microscopic particle 1 in the buffer layer 21 intrudes into both of the crimping part 16 and the conductive part 13 by applying the pressure. In such case, although the thick insulating coat is formed on the surface of the conductive part 13, the conductive part 13 can connect with the crimping part 16 by the large size microscopic particle 1 certainly intruding the insulating coat since the large size microscopic particle 1 is mixed in the buffer layer 21.

Figure 15A:
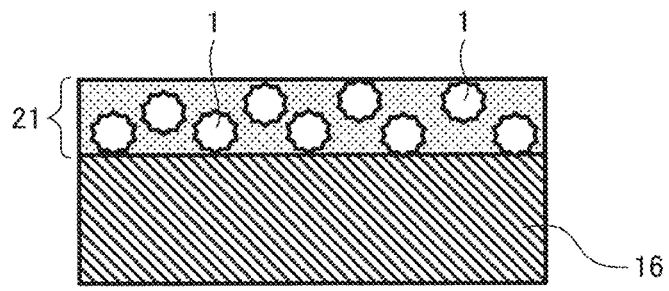
FIGS. 15A to 15C are explanation diagrams showing an example of connection between the conductive part and the crimping part through the small diameter microscopic particles.
Figure 15B:
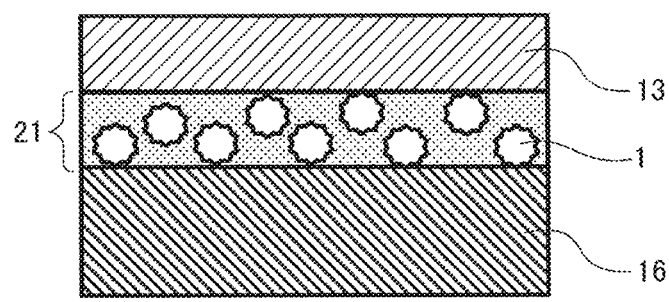
Figure 15C:
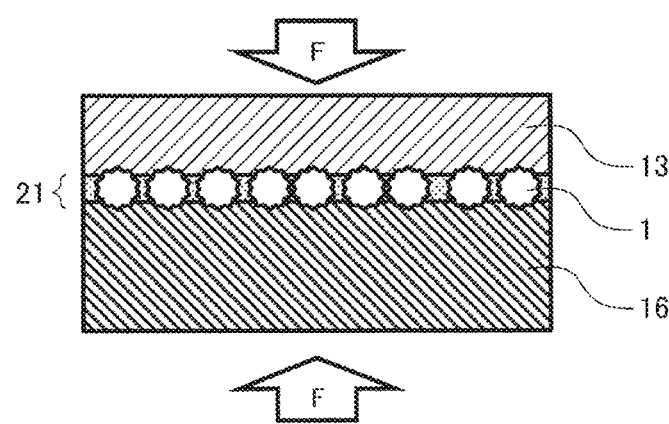

Meanwhile, as the connection between the crimping part and the conductive part 13 is needed at an area whose surface area in the crimping part 16 is small, it is preferable to increase a number of the microscopic particles per unit area of the buffer layer by decreasing the microscopic particle size so as to certainly connect the conductive part 13 with the crimping part 16 by increasing a number of pinning by the microscopic particles (a number of pierced connecting part by the insulating coat). Specifically, as shown in FIGS. 15A to 15C, it is preferable to connect the conductive part 13 with the crimping part 16 by crimping through the buffer layer 21 formed by mixing and dispersing the small diameter microscopic particle 1 having the fractal structure, which comprises the fine protrusion on the surface. As shown in FIG. 15A, the buffer layer 21, in which a plurality of (many) microscopic particles 1 having small microscopic particle size is mixed and dispersed, is formed on the crimping part 16. As shown in FIG. 15B, the conductive part 13 is arranged above the crimping part 16 through the buffer layer 21. As shown in FIG. 15C, the pressure caused by swaging is applied to both of the crimping part 16 and the conductive part 13 from the arrow direction F. Thus, the microscopic particle 1 having the small microscopic particle size in the buffer layer 21 intrudes into both of the crimping part 16 and the conductive part 13 by applying the pressure. In such case, since the microscopic particles 1 having the small microscopic particle size are combined in the buffer layer 21, although the connection with the conductive part 13 is needed at an area whose surface area in the crimping part 16 is small, predetermined number of pinning can be ensured by arranging the microscopic particle 1 having the small microscopic particle size in the buffer layer 21 with high density.

(Microscopic Particle Arrangement in Buffer Layer)

Next, a microscopic particle arrangement which the microscopic particles are mixed and dispersed in the buffer layer will be explained.

Figure 16A:
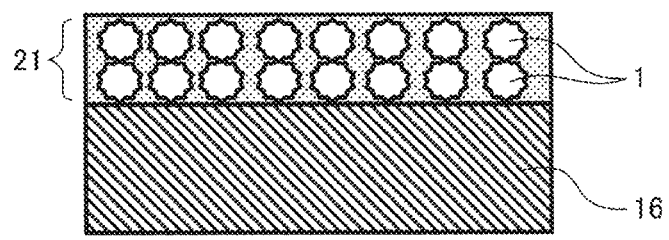
FIGS. 16A to 16C are explanation diagrams showing microscopic particles arranged in the buffer layer in the longitudinal direction.
Figure 16B:
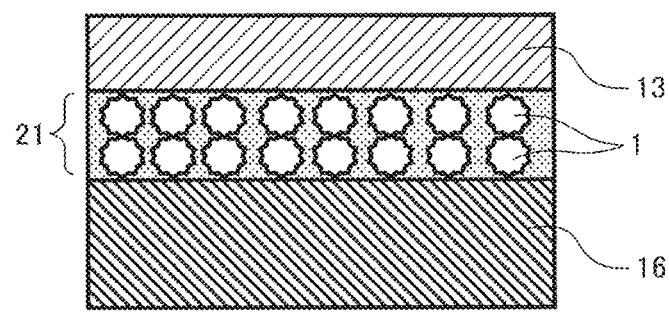
Figure 16C:
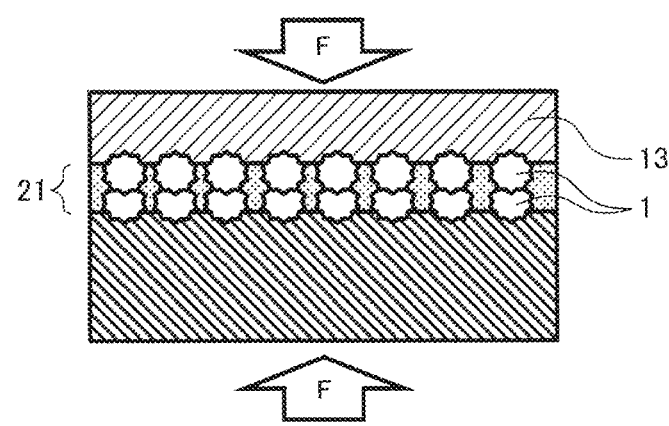

FIGS. 16A to 16C show examples that the microscopic particles are arranged in the buffer layer in the longitudinal direction. That is, as shown in FIG. 16A, the microscopic particles 1 having the fractal structure, which comprises the fine protrusion on the surface, are mixed and dispersed, and arranged in the buffer layer 21 so as to stack vertically in the longitudinal direction (in the thickness direction of the buffer layer 21), so as to be vertical arrangement. As shown in FIG. 16B, the conductive part 13 is arranged above the crimping part 16 thorough the buffer layer 21. As shown in FIG. 16C, the pressure caused by swaging is applied to the crimping part 16 and the conductive part 13 from the arrow direction F. Thus, the microscopic particle 1 in the buffer layer 21 intrudes into both of the crimping part 16 and the conductive part 13 by applying the pressure. In such case, a plurality of microscopic particles 1 (FIGS. 16A to 16C shows two) are vertically arranged and these microscopic particles 1 contact (stick) each other by the pressure in swaging. Moreover, one (lower) microscopic particle 1 intrudes into the crimping part 16 and the other (upper) microscopic particle 1 intrudes into the conductive part 13 in the thickness direction of the buffer layer 21.

The microscopic particles 1 are preferable to be made from magnetic material to apply magnetism to the microscopic particle 1 so as to vertically arrange the microscopic particles 1 in the buffer layer 21. Specifically, as resin binder is used as the material composing the base layer of the buffer layer 21, the microscopic particle 1 can be arranged vertically by applying a magnetic field after mixing and dispersing the microscopic particles 1 having magnetism in the binder. For example, the magnetic field is applied by contiguously arranging a jig that generates a predetermined magnetic pattern to the buffer layer 21 before solidifying (liquid) in which the microscopic particle 1 having magnetism is mixed. As with the case that iron sand gathers above the magnet by moving the magnet close to the iron sand dispersed on paper, the microscopic particles 1 in the binder gathers on the magnetic pattern generated by the jig. Thus, the magnetic pattern generated by the jig is copied on the buffer layer 21. And the microscopic particles 1 are arranged in the state that is stacked on the magnetic pattern. As a result, the microscopic particles 1 can be vertically arranged in the buffer layer 21 corresponding to the arrangement of the magnetic pattern generated by the jig.

Figure 17A:
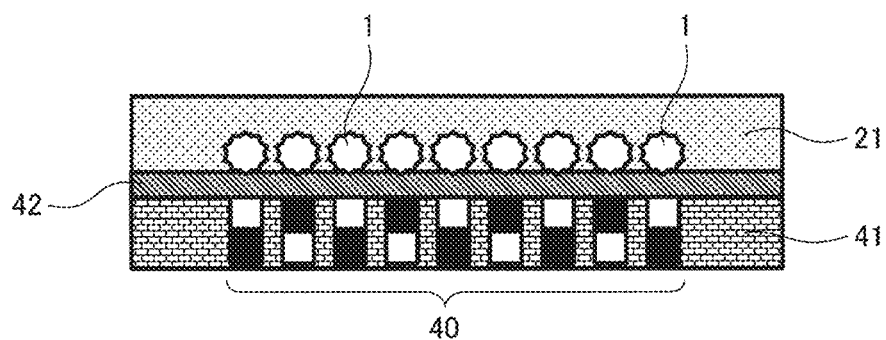
FIGS. 17A to 17C are explanation diagrams showing a method of controlling a microscopic particle arrangement by using a jig.

Since the microscopic particles 1 in the buffer layer 21 are arranged corresponding to the above magnetic pattern, the arrangement of the microscopic particles 1 in the buffer layer 21 can be controlled in not only the thickness direction of the buffer layer 21, but also the surface direction of the buffer layer 21 (the direction orthogonal to the thickness direction of the buffer layer 21). Specifically, as shown in FIG. 17A, the jig 41 that generates the magnetic pattern 40 is closely arranged on the buffer layer 21 before solidifying through a thick film shape support frame 42. In such case, the buffer layer 21 and the magnetic pattern 40 are arranged so as to be separated with a predetermined length by intervening the support frame 42. The magnetic force caused by the magnetic pattern 40 is applied to the microscopic particle 1 mixed in the buffer layer 21. The microscopic particle 1 is arranged above the magnetic pattern 40 by magnetic attraction. Thus, the arrangement of the microscopic particles 1 in the surface direction is copied by the arrangement of the magnetic pattern 40. That is, the microscopic particles 1 can be arranged in the surface direction of the buffer layer 21 corresponding to the arrangement of the magnetic pattern 40. Furthermore, the microscopic particle 1 magnetically attracted by the magnetic force from the magnetic pattern 40 becomes magnetized by the magnetic application. As new microscopic particle 1 is added from above the microscopic particle 1, the newly added microscopic particle gathers on the magnetized microscopic particle. Therefore, the microscopic particle 1 can be vertically arranged in the thickness direction of the buffer layer 21.

Figure 17B:
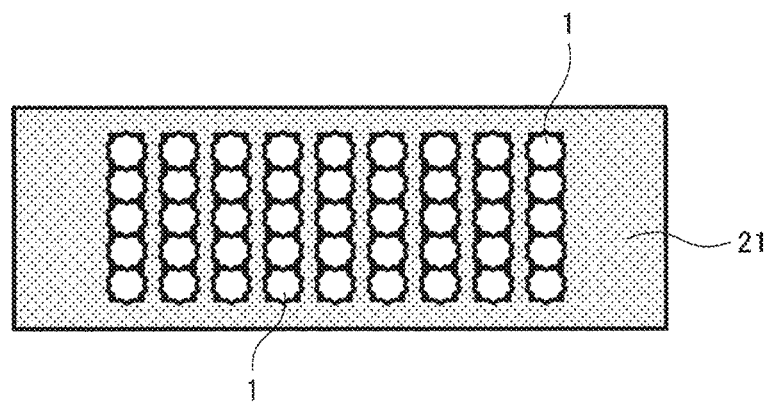
Figure 17C:
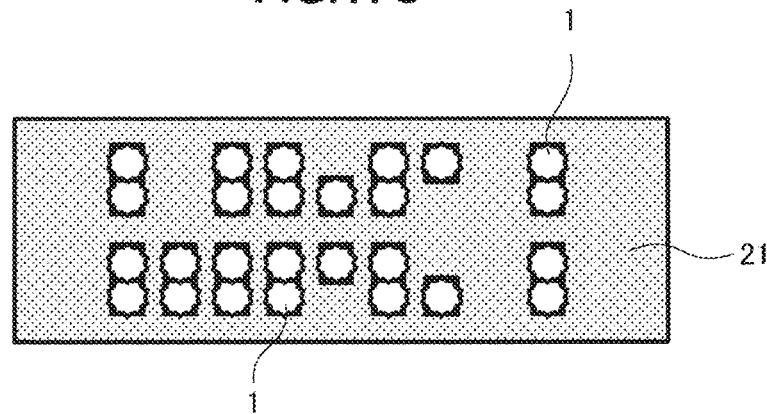

As the magnetic pattern 40 generated from the jig 40 changes, the buffer layer 21, in which the microscopic particles 1 are arranged in multiple array patterns, can be formed. Specifically, the buffer layer 21, in which the microscopic particles 1 are arranged in the array patterns shown in FIG. 17B or 17C, can be formed. As to FIGS. 17B, 17C, many microscopic particles 1 are arranged in the predetermined array in the surface of the buffer layer 21. That is, as shown in FIG. 17B, the array pattern is formed by arranging the plurality of microscopic particles 1 per line (five microscopic particles 1 in FIG. 17B) adjacently in plural lines at specified intervals in the buffer layer 21. As shown in FIG. 17C, the array pattern is arranged by mixing a long line made from a plurality of microscopic particles 1 (two microscopic particles 1 in FIG. 17C) and a short line made from microscopic particles 1 less than the microscopic particles 1 in the long line (one microscopic particle 1 in FIG. 17C).

The buffer layer 21 arranging the microscopic particles 1 in the predetermined pattern can be formed by hardening (such as thermal hardening) the resin binder with keeping the arrangement after arranging the microscopic particle 1 at the specified pattern in the surface direction and thickness direction of the buffer layer 21. Also, the sheet shape buffer layer 22, the sleeve shape buffer layer 23, and the cap shape buffer layer 24 described above can be formed by the same methods. Furthermore, for forming the buffer layer 21 by directly coating liquid paste mixing the microscopic particle 1 (such as the grease) on the inner surface of the crimping part 16, the microscopic particle 1 can be arranged at the predetermined pattern by contiguously arranging the jig that generates the magnetic pattern on the outer surface of the crimping part 16 that is opposite to the coating surface of the liquid paste at the predetermined pattern arrangement.

The pattern forming method to form the predetermined pattern arrangement using the magnetize in the microscopic particle 1 can increase the mechanical and electrical connection strength by using the concave-convex pattern caused by the arrangement of the microscopic particle 1 as with forming the serration (the concave-convex pattern) on the inner surface of the crimping terminal. Moreover, the pattern arrangement of the magnetic pattern 40 can be copied to the buffer layer 21 by contiguously arranging the jig 41 for generating the magnetic pattern instead of the molding die to form the serration at the buffer layer 21 to 24 before solidifying. Therefore, abrasion of the molding die to form the serration caused by pressing repeatedly can be prevented, and the microscopic particle 1 can be stably arranged in the buffer layer at the predetermined pattern arrangement in the long time.

As described above, since the microscopic particle 1 has magnetism and the arrangement of the microscopic particle 1 in the buffer layer 21 is controlled by using the magnetism, the multiple magnetic patterns are generated by the magnet in the cases such as forming the buffer layer 21 on the inner surface of the crimping part 16 by using resin, metal plate, or grease, or forming the sheet shape buffer layer 22, the sleeve shape buffer layer 23, or the cap shape buffer layer 24. Therefore, the microscopic particles 1 can be arranged in the buffer layers 21 to 24 at the predetermined (original) pattern corresponding to the magnetic pattern. Thus, manufacturing the multi type molding die to form conventional serration or complicated managing the molding die is not needed. The throughput in the manufacturing process can be significantly increased.

Figure 18A:
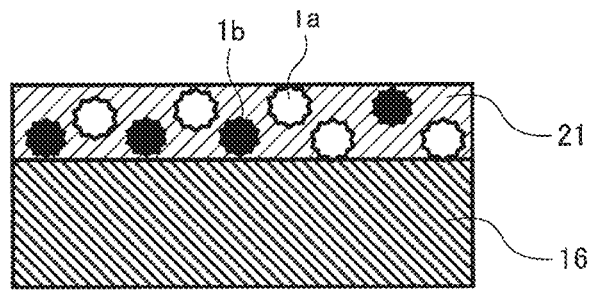
FIGS. 18A to 18C are explanation diagrams showing an example of connection between the conductive part and crimping part through two type microscopic particles mixed in the buffer layer.
Figure 18B:
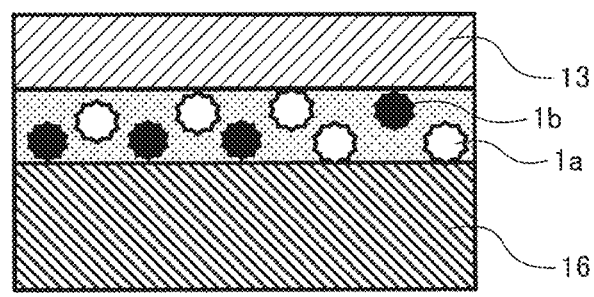

For mixing and dispersing the conductive microscopic particle 1 having the fractal structure, which comprises the fine protrusion 2 on the surface, in the buffer layer, as shown in FIGS. 18A, 18B, two type microscopic particles such as a first microscopic particle 1a and a second microscopic particle 1b may be mixed in the buffer layer 21. The second microscopic particle 1b is different from the first microscopic particle 1a in at least one of composition, structure, or property. As two type microscopic particles 1a, 1b are mixed, the predetermined connection performance can be kept while one type microscopic particle 1 fails to keep the predetermined connection performance.

For example, it is preferable to mix and disperse the two type microscopic particles such as the first microscopic particle 1a made from Cu, which has low resistance, and the second microscopic particle 1b made from Ni in the buffer layer 21 while the contact resistance is needed to control lower so as to control electric corrosion of the crimping terminal 12 within the specified level (permitted). In such case, as all microscopic particles 1 are made from Cu, a part where Cu and Al contacts directly notably spoils by electrically corroding. Meanwhile, replacing part of microscopic particles 1 into Ni can control electric corrosion in whole crimping terminal 12 and have low resistance.

Figure 18C:
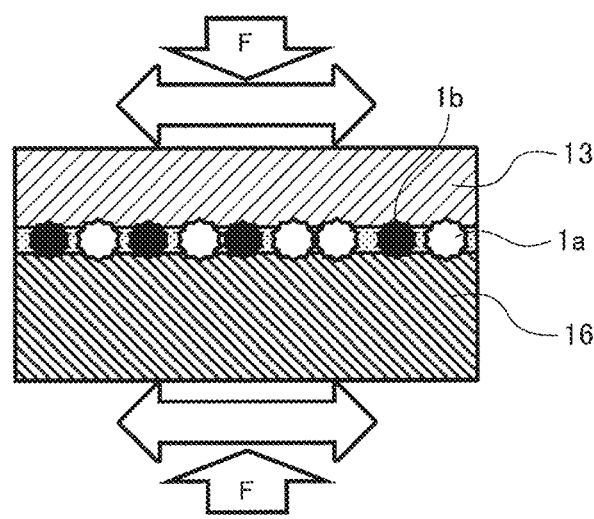

As the hardness of the insulating coat coating the surface of the conductive part 13 is higher than the hardness of the first microscopic particle 1a, it is preferable to mix and disperse the second microscopic particle 1b such as Silica, Alumina, and Zirconia, whose hardness is higher than the hardness of the insulating coat and the first microscopic particle 1a, in the buffer layer 21 with the first microscopic particle 1a. In such case, as all microscopic particles 1 are made from the first microscopic particles 1a, the microscopic particles 1 may fail to pierce the insulating coat sufficiently. Meanwhile, the microscopic particle 1 can certainly pierce through the insulating coat by mixing the second microscopic particle 1b having higher hardness. The first microscopic particle 1a can contact with the exposed base of the conductive part 13. Moreover, as shown in FIG. 18C, The conductive part 13 and the crimping part 16 may reciprocate relatively (including reciprocation caused by vibration) in the orthogonal direction to swaging direction F (the horizontal direction in FIG. 18C). The reciprocation can be realized by moving at least one of the conductive part 13 and the crimping part 16 in the central axis direction of the electric wire 11 in swaging or rotating around the central axis of the electric wire 11. The conductive part 13 and the crimping part 16 slide with interposing the microscopic particles 1a, 2b in the buffer layer 21 by the reciprocation. The above reciprocation expands over the piercing part of the insulating coat by the second microscopic particle 1b. The conductive part 13 can secure electrical conductivity with the crimping part 16 by crimping the first microscopic particle 1a with the base of conductive part 13 at the piercing part.

Although a number of types of the microscopic particles 1 mixed in the buffer layer 21 is two in the present embodiment, it is not limited to. The buffer layer may be formed by mixing and dispersing the microscopic particle having more than three types of different composition, structure, physical property, and chemical property (Method of Manufacturing Microscopic Particle)

Next, a method of manufacturing the microscopic particle will be explained. In this case, Ni is the main element. The method of manufacturing the microscopic particle made from Ni—P metal (hereinafter referred to as "Ni—P microscopic particle") will be explained as the example.

(First Method of Manufacturing)

Firstly, Nickel(II) sulfate hexahydrate is dissolved in pure water to prepare 15 $dm^3$ of aqueous metal salt solution. Sodium hydroxide is dissolved in solution dissolving sodium acetate in pure water at concentration of 1.0 $kmol/m^3$ to prepare 15 $dm^3$ of pH adjusting solution. The above prepared aqueous metal salt solution and above prepared pH adjusting solution are agitationally mixed to prepare 30 $dm^3$ of mixed aqueous solution having a pH of 7.3. The above mixed aqueous solution is heated by an outside heater while the mixed aqueous solution is bubbled with $N_2$ or Ar gas and continuously agitated with keeping the liquid temperature at 343K. Next, Sodium phosphonate is dissolved in pure water at concentration of 1.8 $kmol/m^3$ to prepare 15 $dm^3$ of reducing agent solution. The reducing agent solution is heated by the outside heater for the liquid temperature at 343K. The above aqueous solution (30 $dm^3$) and the above reducing agent solution (15 $dm^3$) are mixed and treated by electroless reducing method while the liquid temperature is controlled between 342K to 344K (343K±1K). This method can form microscopic particle aggregation powder, which the microscopic particle comprises the fine protrusion on the surface and has the fractal structure including Ni and P.

(Second Method of Manufacturing)

Firstly, Nickel (II) sulfate hexahydrate is dissolved in pure water to prepare 15 $dm^3$ of aqueous metal salt solution. Sodium hydroxide is dissolved in solution dissolving sodium acetate in pure water at concentration of 1.0 $kmol/m^3$ to prepare 15 $dm^3$ of pH adjusting solution. The above prepared aqueous metal salt solution and above prepared pH adjusting solution are agitationally mixed to prepare 30 $dm^3$ of mixed aqueous solution having a pH of 7.3. The above mixed aqueous solution is heated by an outside heater while the mixed aqueous solution is bubbled with $N_2$ or Ar gas, and continuously agitated while the liquid temperature is controlled at 363K. Next, Sodium phosphonate is dissolved in pure water at concentration of 1.8 $kmol/m^3$ to prepare 15 $dm^3$ of reducing agent solution. The reducing agent solution is heated by the outside heater for the liquid temperature at 363K. The above aqueous solution (30 $dm^3$) and the above reducing agent solution (15 $dm^3$) are mixed and treated by electroless reducing method while the liquid temperature is controlled at the liquid temperature between 362K to 364K (363K±1K). This method can form microscopic particle aggregation powder, which the microscopic particle comprises the fine protrusion on the surface and has the fractal structure including Ni and P. Further, the microscopic particle that is controlled such that the height of fine protrusion is higher than the microscopic particle formed in the above first method of manufacturing can be obtained.

(Third Manufacturing Method)

Firstly, Nickel(II) sulfate hexahydrate and Copper sulfate pentahydrate, which regulate molar ratio between Ni and Cu less than Ni/Cu=239 is dissolved in pure water to prepare 15 $dm^3$ of aqueous metal salt solution. The copper sulfate pentahydrate is an example of element applying as catalytic poison and it is not limited to. The catalytic poison may be a hydrate applying as the catalytic poison, which can control radical reduction the microscopic particle structure precisely. Sodium hydroxide is dissolved in solution dissolving sodium acetate in pure water at concentration of 1.0 $kmol/m^3$ to prepare 15 $dm^3$ of pH adjusting solution. Above prepared aqueous metal salt solution and above prepared pH adjusting solution are agitationally mixed to prepare 30 $dm^3$ of mixed aqueous solution having a pH of 7.3. The above mixed aqueous solution is heated by an outside heater while the mixed aqueous solution is bubbled with $N_2$ or Ar gas, and continuously agitated while the liquid temperature is controlled at 363K. Next, Sodium phosphonate is dissolved in pure water at concentration of 1.8 $kmol/m^3$ to prepare 15 $dm^3$ of reducing agent solution. The reducing agent solution is heated by the outside heater for the liquid temperature at 363K. The above aqueous solution (30 $dm^3$) and the above reducing agent solution (15 $dm^3$) are mixed and treated by electroless reducing method while the liquid temperature is controlled between 362K to 364K (363K±1K). This method can form microscopic particle aggregation powder which the microscopic particle comprises the fine protrusion on the surface and has the fractal structure including Ni and P. Further, the microscopic particle that is controlled such that the height of the fine protrusion and a curvature radius of the tip of fine protrusion are respectively within the microscopic particle size formed by the first method of manufacturing and the second method of manufacturing (the middle size) comparing with the microscopic particles obtained by the first method of manufacturing and the second method of manufacturing.

For the above method of manufacturing, the microscopic particle having the fractal structure including Ni and P, which comprises the fine protrusion on the surface, is statistically analyzed by the picture obtained from microscopes such as normal optical microscope, scanning electron microscope (SEM), transmission electron microscope (TEM), and atomic force microscope (AFM) so as to obtain the predetermined microscopic particle structure. And an optimum condition to form the microscopic particle statically is observed by analyzing in average microscopic particle size and distribution by small angle X-ray scattering method.

(Method of Manufacturing Resin Film Mixing and Dispersing Microscopic Particles)

Next, a method of manufacturing the resin film mixing and dispersing the microscopic particles will be explained below. The method of manufacturing the resin film described below is applied to forming the buffer layer made from resin or forming the buffer layer in the sheet shape, the sleeve shape, or the cap shape from resin. As the resin film, which is a binder mixing and dispersing the fractal structure microscopic particles comprising the fine protrusion in the present invention is preferable to be a thermoplastic resin generally used for the insulating adhesion etc., a thermosetting resin set by heating process, or a light curing resin cured by light. A hardening resin having excellent thermos resistance and excellent humidity resistance after connecting the electric wire with the crimping terminal is appropriate to the environment resistant material. Especially, the epoxy adhesion (the epoxy resin) from the hardening resin can harden in short time. Work efficiency in the manufacturing process increases. Furthermore, the epoxy adhesion has high adhesive property caused by the molecular structure forming the epoxy adhesion. The electric wire with terminal having high reliability can be manufactured. For example, the general epoxy resin used for the epoxy adhesion is a resin mixing high molecular epoxy resin (phenoxy resin), or at least one of urethane, polyester, and nitrile butadiene rubber (NBR) in the epoxy as the main component, which adds modifying agent such as latent curing agent or coupling agent, or catalyzer so as to reform effectively. The solid or liquid epoxy resin may be used as starting material.

In this case, although the generally effective epoxy resin film is shown as the binder, the resin film may be the film except the epoxy film that the film has high adhesive property or hardening property. For example, the binder may mix the resin such as phenol resin or achilleic resin.

One example of the method to mix and disperse the microscopic particles in the resin film is described below. Firstly, at least one of liquid resins such as epoxy resin, phenol resin, achilleic resin used as the binder and organic solvent such as acetone are respectively calculated in the predetermined amounts. Then, the calculated liquid resin and the organic solvent are mixed using a quartz glass tube. Then, the Ni—P microscopic particle powder having the fractal structure, which comprises the fine protrusion, obtained by the above method of manufacturing, are charged and mixed in the mixed solution of the above liquid resin and organic solvent with predetermined amount. Next, after dispersing the microscopic particle powder evenly in the mixed solution and standing the resin material obtained by the process in the predetermined time. Finally, the resin material is formed in film having the predetermined thickness using pressing role. Thus, the resin film mixing and dissipating the microscopic particles can be obtained. Meanwhile, as the buffer layer made from the resin is formed on the inner surface of the crimping part of the crimping terminal, it is preferable to coat the resin material, in which the above microscopic particle powder is evenly dispersed in the mixed solution, on the inner surface of the crimping part.

(Method of Manufacturing Metal Plating Layer Combining and Dispersing Microscopic Particle)

Next, the method of manufacturing a metal plating layer combining and dispersing the microscopic particles will be explained below. The method of manufacturing the metal plating layer described below is applied to form the buffer layer by metal plating. Electroplating having anode and cathode is used as the method.

Firstly, the Ni—P microscopic particles having the fractal structure, which comprises the fine protrusion, are put into the desired plating liquid. Next, the Ni—P microscopic particles in the colloidal microscopic particle state reaches to the cathode surface using the outside force such as mix or vibration, and physically adsorb the cathode surface in the plating bath mixing the microscopic particle. Meanwhile, as the concentrations between the Ni—P microscopic particle colloidal in the plating liquid and the dispersed Ni—P microscopic particle in the metal plating layer has the Langmuir single molecule adsorption isotherm relation, the adsorption amount is constant in more than some concentration.

Properly controlling the acidity and basicity (pH) in the plating liquid so as to increase a number of the microscopic particles mixed and dispersed in the plating layer until the desired number, the control leads proton movement at solution interface between the microscopic particle and the plating liquid. The colloidal microscopic particle charges suitably as the positive charge. As a result, the microscopic particles can be adsorbed on the cathode surface until the desired number caused by electrostatic interaction by the Coulomb's force based on iontophoresis. Meanwhile, according to the form of each microscopic particle (such as the structure or size), heteroaggrigation causes between the microscopic particle and the cathode. The dispersion in the plating layer may be uneven. Thus, the Ni—P microscopic particle put into the plating liquid is controlled so as not to be extremely uneven in each microscopic particle number ratio or each microscopic particle size ratio. For example, the microscopic particle size ratio of each microscopic particle is preferable to be within a range between 10:10 and 10:5.

Then, the Ni—P microscopic particle adsorbed on the cathode surface is contained in the metal precipitated surround and included in the plating layer. It is preferable to add surfactant so as to disperse the microscopic particles most effectively while part of the Ni—P microscopic particles having the fractal structure, which comprises fine protrusion, shows hydrophobic. Meanwhile, as repeatedly hydrophobing is necessary in causing a microscopic particle eutectoid, it is necessary for the surfactant to be separated or inactive in causing the eutectoid. In this case, as the microscopic particle can cause the microscopic particle eutectoid on the plate coating it is preferable to use the surfactant (cationic surfactant) having cationic hydrophilic group comprising azobenzene group, which can inactive the surfactant using cathodic reduction in plating, has relatively state constant molecular weight as the material, and is thought that the surfactant can easily synthesis. The surfactant used in this method of manufacturing is not limited to above azobenzene modified cationic surfactant, the surfactant may be able to desorb in the eutectoid or inactive in the eutectoid.

(Manufacturing Grease, "Compound", Mixing and Dispersing Microscopic Particle)

Next, a method of manufacturing the grease (compound) mixing and dispersing the microscopic particles will be explained. The method of manufacturing the grease described below is applied to form the buffer layer by the grease. As the grease (compound) to coat on the inner surface of the crimping part of the crimping terminal or the surface of the conductive part of the electric wire, it is preferable to apply silicon compound element having excellent weather resistance, which is low degradation level while the grease is exposed under severe environment. However, the silicone grease fails to have electric conductively. As the buffer layer is formed from the grease, the junction between the electric wire and the crimping terminal fails to have low resistance. Thus, the grease is necessary to add the above electric conductive microscopic particles having the fractal structure, which comprises the fine protrusion in forming the buffer layer from the grease. The microscopic particle works as addition agent so as to improve the electric conductivity for at least the buffer layer from the addition agents improving multiple functions. Mixing and kneading the electrical conductive microscopic particle, which is the addition agent so as to improve multiple functions and has conductivity, may use thermal mixing or decompression mixing corresponding to availability or importance in individual application. Moreover, the compound may be added oxidant inhibitor, flame retardant, heat resistant addition agent, pigment, forming agent, crosslinking agent, hardener, curing agent, or surface lubricating etc. except the microscopic particle. Furthermore, the silica, aluminum, zirconia, mica, clay, zinc carbonate, zinc oxide, glass beads, poly-dimethyl siloxane, polymethyl silsesquioxane, or alkenyl group linked poly siloxane compound etc. may be add to the crimping terminal substantially. For example, a sealed type kneader is used for kneading the addictive including the microscopic particle and the grease. The microscopic particle is evenly dispersed in the grease using single or multiple roles, or a colloid mill machine etc. Thus, the grease combining and dispersing the microscopic particle can be obtained. As the grease coated on the inner surface of the crimping part or the outer surface of the conductive part, the buffer layer can be formed on the coating surface. By processing predetermined thermal process etc. after forming the buffer layer on the inner surface of crimping part or the surface of conductive part and crimping these by swaging, the electric wire with the crimping terminal having excellent weather resistance, which both connecting part strength increase with keeping the excellent electric conductivity between the crimping part and the conductive part can be obtained.

Next, one best mode condition to achieve the present invention will be explained below. Firstly, in the case that the conductive part 13 of the electric wire 11 is made from Al (or Al alloy) and the crimping terminal 12 is made from Cu (or Cu alloy), the suitable condition of the microscopic particle dispersed and mixed in the buffer layer can be listed that, firstly, the microscopic particle 1 is made from Ni—P metal, secondly, the microscopic particle 1 comprises the fractal structure, thirdly, the tip curvature radius of the fine protrusion 2 of the microscopic particle 1 is not less than 0.03 nm. The reason will be described below.

Firstly, Ni that is the main element of the microscopic particle 1 made from Ni—P metal has ionization tendency between Al as the structure material of the conductive part 13 and Cu as the structure material of the crimping terminal 12. Hereby, processing in the electric erosion can decrease comparing with the state that Al contacts with Cu directly. Therefore, dependability and lifetime of the electric wire with the crimping terminal can increase. Further, Ni that is the main element of the microscopic particle 1 has higher hardness than Cu that is the structure material of the crimping terminal 12. Thus, the Ni—P microscopic particle comprising the fine protrusion can pierce the insulating coat effectively comparing with piercing the insulating coat on the surface of the conductive part using the crimping terminal on which serration (concave-convex pattern) is formed. Therefore, the Ni—P microscopic particle can obtain certain electrical conduction.

Furthermore, since Ni that is the main element of the microscopic particle 1 is the element having high magnetism, the microscopic particle 1 can process as an electromagnetic shield to shut leaked magnetic field from the conductive part of the electric wire by dispersing Ni in whole buffer layer. Therefore, the electric noise caused in turning on in the electric wire can reduce and malfunction in peripherals can be controlled. Moreover, as the microscopic particle 1 is the fractal structure, which comprises several layers of fine protrusions, the insulating coat of the conductor of the electric wire can be pierced with low additional force comparing with the sphere shape. Also, since the diameter of the microscopic particle 1 is within μm order, the contact area with the conductor of the electric wire in swaging is very small while the tip curvature radius of the microscopic particle is within nm order. In this case, the force applied in the contact part between the microscopic particle and the conductor of the electric wire in adding force is about $10^6$ times. Thus, the insulating coat can be easily pierced by the low additional force. As a result, the certain electrical connection between the crimping terminal 12 and the conductive part 13 can be obtained. The contact resistance between the both crimping terminal 12 and conductive part 13 can lower. Further, as the microscopic particle has many fine protrusions on the surface, the fine protrusions more than a number of the microscopic particles mixed and dispersed in the buffer layer can intrude into the conductor of the electric wire. Thus, looseness in the junction (contact part) between the crimping terminal 12 and the conductive part 13 caused by creeping can be controlled. The mechanical connecting strength in whole connecting part can be closely ensured.

MODIFIED EXAMPLES

A technical scope of the present invention is not limited by above embodiments. The various kinds of modifications can be implemented without departing from the gist of the invention.

According to the above embodiment, although metallic microscopic particle having conductivity is used as the microscopic particle mixed and dispersed in the buffer layer, it is not limited to. The microscopic particle made from high hardness material such as Diamond Like Carbon (DLC), which has resistance higher than metal and lower than the insulation can pierce the insulating coat on the conductor surface of the electric wire.

According to the above embodiment, although the microscopic particle 1 to mix and disperse in the buffer layers 21 to 24 comprises multiple fine protrusions 2 on the surface of the microscopic particle 1, as the structure of the microscopic particle 1, the fine protrusion 2 may comprise multiple second fine protrusions (not shown) on the surface of fine protrusion 2, which are smaller than the fine protrusion 2. The below advantageous effects can be obtained by applying the fine protrusion 2 comprises the second fine protrusion on the surface of the fine protrusion 2. That is, as the conductive part 13 is made from strand wire made from a plurality of extra fine wires, a region, which the fine protrusion 2 fails to pierce the insulating film on the extra fine wire in crimping, may remain. Meanwhile, as the microscopic particle having the fractal structure, which comprises the second fine protrusion smaller than the fine protrusion 2 on the surface of the fine protrusion 2, the second fine protrusion certainly complements piercing the insulating film on the extra fine wire. Therefore, a desired property can be obtained in the strength and the conductivity of the connecting part of the conductive part made from the extra fine wire.

As to the waterproofness to control degradation caused by the electro corrosion in the electric wire with the crimping terminal, the desired waterproofness can be estimated by coating and completely sealing the region except the connecting part for external connection (the connecting part 15) with a resin case (such as housing) or the adhesion having high waterproofness. The electric wire with the crimping terminal can obtain reliability and increase the life time.

The electric wire used for the electric wire with the crimping terminal is not limited to Al electric wire. It may be Cu electric wire. As to using Cu electric wire, if Cu electric wire can reduce its thickness with keeping the desired property by the wire improvement etc., total material cost in Cu can decrease and the electric wire can be easily install by weight reducing of the electric wire.

As Al electric wire is applied to the electric wire with the crimping terminal, total weight and material cost in the wire and the cable harness can decrease comparing with applying the Cu electric wire to the electric wire with the crimping terminal. As a result, Vehicles such as train, care, ship, airplane whose weight decreased in body from conventional vehicles with keeping same property with the conventional harness in using the electric wire with the crimping terminal for the vehicles can be manufactured. Therefore, the transport system reducing energy consumption in the operation can be built.

Preferable Embodiments in Present Invention

Preferable embodiments in the present invention will be noted below.

(Note 1)

The first embodiment of the present invention provides a crimping terminal, comprising a crimping part that is compressed to a conductive part of an electric wire, and a buffer layer formed on a surface where the crimping part contacts the conductive part, wherein the buffer layer comprises a resin, a plating or a grease and a conductive microscopic particle that is mixed and dispersed therein, and wherein the microscopic particle comprises a fractal structure comprising a fine protrusion on a surface of the microscopic particle.

(Note 2)

The crimping terminal according to Note 1, wherein the microscopic particle preferably comprises a second fine protrusion on the surface of the fine protrusion, which is smaller than the fine protrusion.

(Note 3)

The crimping terminal according to Note 1 or 2, wherein the tip curvature diameter of the fine protrusion arranged on a surface of the microscopic particle is preferably not less than 0.03 nm and not more than 500 nm.

(Note 4)

The crimping terminal according to any one of Notes 1 to 3, wherein a tip curvature diameter of the fine protrusion arranged on a surface of the microscopic particle is preferably not less than 0.0006% of a radius of the microscopic particle and not more than 10% of a radius of the microscopic particle (Note 5)

The crimping terminal according to any one of Notes 1 to 4, wherein a height of the fine protrusion arranged on a surface of the microscopic particle is preferably less than 0.5% of a diameter of the microscopic particle.

(Note 6)

The crimping terminal according to any one of Notes 1 to 5, wherein a height of the fine protrusion arranged on a surface of the microscopic particle is preferably not less than 0.05 nm and not more than 50 nm.

(Note 7)

The crimping terminal according to any one of Notes 1 to 6, wherein the microscopic particle preferably has higher hardness than an insulating coat formed on a surface of the conductive part.

(Note 8)

The crimping terminal according to any one of Notes 1 to 7, wherein the microscopic particle is preferably made from a metal or an alloy composed of an element having ionization tendency between an element of the conductive part and an element of the crimping part.

(Note 9)

The crimping terminal according to any one of Notes 1 to 8, wherein the microscopic particle is preferably made from a metal or an alloy composed of an element whose standard oxidation reduction potential between hydrated ion and single metal in aqueous solution is within −1.7 V to 0.4 V.

(Note 10)

The crimping terminal according to any one of Notes 1 to 9, wherein the microscopic particle is preferably made from a metal or an alloy including at least one of Zn, Cr, Fe, Co, Ni, and Sn.

(Note 11)

The crimping terminal according to any one of Notes 1 to 9, wherein the microscopic particle is preferably made from Ni containing P.

(Note 12)

The crimping terminal according to any one of Notes 1 to 9, wherein the microscopic particle is made from Ni containing an inevitable impurity element.

(Note 13)

The crimping terminal according to any one of Notes 1 to 9, wherein the conductive part is preferably made of Al or Al alloy, wherein the crimping terminal is preferably made of Cu or Cu alloy, and wherein the microscopic particle is preferably made of Ni containing P.

(Note 14)

The crimping terminal according to any one of Notes 1 to 9, wherein the microscopic particle preferably comprises a core and a coating layer coating the core.

(Note 15)

The crimping terminal according to Note 14, wherein the core is preferably made of Ni, and wherein the coating layer is preferably made from Ni—P layer.

(Note 16)

The crimping terminal according to Note 15, wherein the coating layer is preferably made from Ni—P layer of which component ratio between Ni and P is inclined in a thickness direction of the coating layer.

(Note 17)

The crimping terminal according to Note 14, wherein the core is preferably made of Cu, and wherein the coating layer is preferably made from Ni—P layer.

(Note 18)

The crimping terminal according to Note 14, wherein the core is preferably made of Cu, and wherein the coating layer is preferably made of any one of alloys from Sn—Ag—Cu alloy, Sn—Ag alloy, Sn—Bi alloy, and Au—Sn alloy, or metals including at least one element from Au, Sn, Ag, and Pd.

(Note 19)

The crimping terminal according to any one of Notes 1 to 18, wherein the microscopic particle is preferably magnetized.

(Note 20)

The crimping terminal according to any one of Notes 1 to 19, wherein the microscopic particle is preferably stacked in a thickness direction of the buffer layer.

(Note 21)

The crimping terminal according to any one of Notes 1 to 20, wherein the microscopic particle is preferably arranged in a predetermined arrangement in a surface of the buffer layer.

(Note 22)

The crimping terminal according to any one of Notes 1 to 21, wherein the microscopic particle preferably comprises a first microscopic particle, and a second microscopic particle that is different from the first microscopic particle in at least any one of component, structure, or character.

(Note 23)

The crimping terminal according to any one of Notes 1 to 22, wherein the microscopic particle preferably mixes any one of single crystal structure, multi crystal structure, or an amorphous structure, or at least two structures from the single crystal structure, the multi crystal structure, or the amorphous structure.

(Notes 24)

The crimping terminal according to any one of Notes 1 to 23, wherein the microscopic particle preferably has multi-layer structure or cylindrical structure.

(Notes 25)

The crimping terminal according to any one of Notes 1 to 24, wherein the buffer layer is preferably made from a resin, plating, or grease, which has waterproofness and corrosion resistance for the conductive part and the crimping part.

(Notes 26)

The second embodiment of the present invention provides a crimping terminal, comprising a crimping part that is compressed to a conductive part of an electric wire, and a buffer layer formed on a surface where the crimping part contacts the conductive part, wherein the buffer layer comprises a conductive microscopic particle that is mixed and dispersed therein, and wherein the microscopic particle comprises a polyhedral structure.

(Note 27)

The third embodiment of the present invention provides a crimping terminal, comprising a crimping part that is compressed to a conductive part of an electric wire, and a buffer layer formed on a surface where the crimping part contacts the conductive part, wherein the buffer layer comprises a conductive microscopic particle that is mixed and dispersed therein, and wherein the microscopic particle comprises one of a spherical structure, an elliptic structure, a cylindrical structure, a cone structure, or a Fulleren structure.

(Note 28)

The fourth embodiment of the present invention provides a crimping terminal, comprising a crimping part that is compressed to a conductive part of an electric wire, and a buffer layer formed on a surface where the crimping part contacts the conductive part, wherein the buffer layer comprises a conductive microscopic particle that is mixed and dispersed therein, and wherein the microscopic particle comprises a carbon nanotube microscopic particle. Meanwhile, the crimping terminals described in the above second to fourth embodiment can apply the structures described in Notes 2 to 25 within a range where the combination in structures fails to be obstructed.

(Note 29)

The fifth embodiment of the present invention provides a method of manufacturing a crimping terminal, which comprises a crimping part that is compressed to a conductive part of the electric wire, wherein the method comprises a process to form a buffer layer in which a conductive microscopic particle having a fractal structure which comprises a fine protrusion on a surface of the conductive microscopic particle are mixed and dispersed on a surface where the crimping part contacts the conductive part.

(Note 30)

The sixth embodiment of the present invention provides an electric wire with a crimping terminal, comprising an electric wire comprising a conductive part, and a crimping terminal comprising a crimping part that is compressed to a conductive part of the electric wire, wherein a buffer layer comprising a resin, a plating or a grease that is interposed in a contact interface between the conductor part and the crimping part, wherein a conductive microscopic particle that comprises a fractal structure comprising a fine protrusion on a surface of the microscopic particle is mixed and dispersed in the buffer layer, and wherein the microscopic particle in the buffer layer pierces an insulating coat on a surface of the conductive part and contacts the conductive part.

(Note 31)

The electric wire with the crimping terminal according to Note 30, wherein the buffer layer is preferably made from a resin, plating, or grease having waterproofness and corrosion resistance to the conductive part and the crimping part.

(Note 32)

The seventh embodiment of the present invention provides a method of manufacturing an electric wire with a crimping terminal, comprising an electric wire comprising a conductive part, and a crimping terminal comprising a crimping part that is compressed to a conductive part of the electric wire, wherein the method comprises a first process to form a buffer layer by mixing and dispersing a conductive microscopic particle having a fractal structure, which comprises a fine protrusion on the conductive microscopic particle, on a surface where the crimping part contacts the conductive part, and a second process to crimp the crimping part that the buffer layer formed in the first process on the conductive part is formed.

(Note 33)

The eighth embodiment of the present invention provides a method of manufacturing an electric wire with a crimping terminal, comprising an electric wire comprising a conductive part, and a crimping terminal comprising a crimping part that is compressed to a conductive part of the electric wire, wherein the method comprises a first process to form a buffer layer by mixing and dispersing a conductive microscopic particle having a fractal structure, which comprises a fine protrusion on a surface of the conductive microscopic particle, in a predetermined shape, and a second process to crimp the crimping part on the conductive part while the buffer layer obtained in the first process is attached on the conductive part.

(Note 34)

The method of manufacturing the electric wire with the crimping terminal according to Note 33, wherein a magnetized microscopic particle preferably disperses in a liquid binder and an arrangement of the microscopic particle in the binder is preferably controlled using a jig that generates a predetermined magnetic patter in the first process.

(Note 35)

The method of manufacturing the electric wire with the crimping terminal according to Note 33, wherein the buffer layer is preferably formed in sheet shape in the first process, and wherein the sheet shape buffer layer is preferably attached on the conductive part by winding in the second process.

(Note 36)

The method of manufacturing the electric wire with the crimping terminal according to Note 33, wherein the buffer layer is preferably formed in sleeve shape or cap shape in the first process, and wherein the sleeve shape buffer layer or the cap shape buffer layer is preferably attached on the conductive part by fitting in the second process.

(Note 37)

The method of manufacturing the electric wire with the crimping terminal according to Note 36, wherein a slit is preferably arranged at an entrance side opening of the buffer layer in forming the buffer layer in the sleeve shape or the cap shape in the first process.

(Note 38)

The method of manufacturing the electric wire with the crimping terminal according to Note 36, wherein an inner diameter of the buffer layer is preferably formed so as to be gradually small from an entrance side to an opposite side in forming the buffer layer in the sleeve shape or the cap shape in the first process.

What is claimed is:
1. A crimping terminal, comprising:
   a crimping part that is compressed to a conductive part of an electric wire; and
   a buffer layer formed on a surface where the crimping part contacts the conductive part, wherein the buffer layer comprises a resin, a plating or a grease and a conductive microscopic particle that is mixed and dispersed therein, wherein the microscopic particle comprises a fractal structure comprising a fine protrusion on a surface of the microscopic particle, wherein the crimping part comprises a flat surface, wherein a tip curvature diameter of the fine protrusion arranged on a surface of the microscopic particle is not less than 0.0006% of a radius of the microscopic particle and not more than 10% of the radius of the microscopic particle, wherein a height of the fine protrusion arranged on the surface of the microscopic particle is less than 0.5% of a diameter of the microscopic particle, and wherein the microscopic particle comprises Ni including P.

2. The crimping terminal according to claim 1, wherein the microscopic particle further comprises a coating layer coating a core, wherein the core comprises Ni, and wherein the coating layer comprises an Ni—P layer.

3. An electric wire with a crimping terminal, comprising:

an electric wire comprising a conductive part; and a crimping terminal comprising a crimping part that is compressed to the conductive part of the electric wire, wherein a buffer layer comprising a resin, a plating or a grease that is interposed in a contact interface between the conductive part and the crimping part, wherein a conductive microscopic particle that comprises a fractal structure comprising a fine protrusion on a surface of the microscopic particle is mixed and dispersed in the buffer layer, wherein the microscopic particle in the buffer layer pierces an insulating coat on a surface of the conductive part and contacts the conductive part, wherein the crimping part comprises a flat surface, wherein a tip curvature diameter of the fine protrusion arranged on the surface of the microscopic particle is not less than 0.0006% of a radius of the microscopic particle and not more than 10% of the radius of the microscopic particle, wherein a height of the fine protrusion arranged on the surface of the microscopic particle is less than 0.5% of a diameter of the microscopic particle, and wherein the microscopic particle comprises Ni including P.

4. The crimping terminal according to claim 1, wherein the conductive part comprises a flat surface that opposes and is substantially parallel to the flat surface of the crimping part.

5. The crimping terminal according to claim 3, wherein the conductive part comprises a flat surface that opposes and is substantially parallel to the flat surface of the crimping part.

6. The crimping terminal according to claim 4, further comprising a plurality of microscopic particles of uniform size that form electrically conductive paths when the fine protrusions thereon intrude into the flat surfaces of the conductive part and crimping part.

7. The crimping terminal according to claim 5, further comprising a plurality of microscopic particles of uniform size that form electrically conductive paths when the fine protrusions thereon intrude into the flat surfaces of the conductive part and crimping part.

8. The crimping terminal according to claim 2, wherein a component ratio between Ni and P in the Ni—P layer is inclined in a thickness direction of the coating layer.

9. The crimping terminal according to claim 2, wherein the microscopic particle has a cylindrical structure.

* * * * *